T

United States Patent
Singh

(10) Patent No.: US 10,506,088 B1
(45) Date of Patent: Dec. 10, 2019

(54) PHONE NUMBER VERIFICATION

(71) Applicant: AMAZON TECHNOLOGIES, INC., Seattle, WA (US)

(72) Inventor: Arunjeet Singh, Redmond, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 0 days.

(21) Appl. No.: 15/714,504

(22) Filed: Sep. 25, 2017

(51) Int. Cl.
| | | |
|---|---|---|
| H04M 1/2745 | (2006.01) | |
| H04M 1/27 | (2006.01) | |
| H04L 29/08 | (2006.01) | |
| H04M 3/42 | (2006.01) | |
| G06Q 10/10 | (2012.01) | |
| H04M 7/00 | (2006.01) | |

(52) U.S. Cl.
CPC ..... *H04M 1/274533* (2013.01); *H04M 1/271* (2013.01); *H04M 1/274508* (2013.01); *G06Q 10/109* (2013.01); *H04L 67/30* (2013.01); *H04L 67/306* (2013.01); *H04M 3/42102* (2013.01); *H04M 7/0057* (2013.01); *H04M 2201/40* (2013.01); *H04M 2215/46* (2013.01)

(58) Field of Classification Search
CPC ........... H04M 1/274533; H04M 1/271; H04M 1/274508; H04M 3/42102; H04M 7/0057; H04M 2215/46; H04M 2201/40; G06Q 10/109; H04L 67/306; H04L 67/30
See application file for complete search history.

(56) References Cited

U.S. PATENT DOCUMENTS

| | | | | |
|---|---|---|---|---|
| 5,774,859 A | * | 6/1998 | Houser | H04N 5/44543 348/E5.103 |
| 6,513,063 B1 | * | 1/2003 | Julia | G06F 9/465 709/219 |
| 6,519,479 B1 | * | 2/2003 | Garudadri | G10L 15/22 379/142.01 |
| 7,013,283 B1 | * | 3/2006 | Murdock | H04N 7/17318 348/E7.071 |
| 7,260,538 B2 | * | 8/2007 | Calderone | 348/14.05 |
| 9,396,727 B2 | * | 7/2016 | Tzirkel-Hancock | G10L 15/22 |
| 9,621,698 B2 | * | 4/2017 | Brunn | H04L 65/1069 |
| 9,824,686 B2 | * | 11/2017 | Kim | G10L 15/22 |
| 9,967,382 B2 | * | 5/2018 | Hart | H04M 1/271 |
| 9,973,920 B2 | * | 5/2018 | Brinskele | H04W 8/20 |
| 10,074,369 B2 | * | 9/2018 | Devaraj | G10L 15/22 |
| 2010/0124325 A1 | * | 5/2010 | Weng | G10L 15/22 379/265.11 |

(Continued)

*Primary Examiner* — Brian T O Connor
(74) *Attorney, Agent, or Firm* — Pierce Atwood LLP

(57) ABSTRACT

A system and corresponding method is provided to receiving a phone number for a mobile device as part of a process of associating the phone number with a communication profile. A communication system commands a device connected to the communication system and to a mobile device to cause the mobile device to call a verification phone number assigned to the communication system. The communication system receives the phone number of the mobile device via the verification phone number. The communication system also retrieves phonebook data from the mobile device for storage and subsequent use. Receiving phone number, the phonebook data can be performed with minimal efforts on part of the user beyond connecting the mobile device to the device.

22 Claims, 16 Drawing Sheets

(56) References Cited

U.S. PATENT DOCUMENTS

| | | | | |
|---|---|---|---|---|
| 2016/0142541 A1* | 5/2016 | Sharpe | ................ | H04M 3/5141 |
| | | | | 379/92.01 |
| 2016/0372113 A1* | 12/2016 | David | ..................... | H04M 1/64 |
| 2017/0353533 A1* | 12/2017 | Thapar | ................. | G06Q 10/109 |
| 2018/0054504 A1* | 2/2018 | Hart | ...................... | H04M 1/271 |
| 2018/0054505 A1* | 2/2018 | Hart | ...................... | H04M 1/271 |
| 2018/0063326 A1* | 3/2018 | Tichauer | ............. | H04M 3/4936 |
| 2018/0189017 A1* | 7/2018 | Ghafourifar | .......... | G06F 3/1454 |
| 2018/0262902 A1* | 9/2018 | Brinskele | ................ | H04W 8/20 |
| 2018/0336449 A1* | 11/2018 | Adan | ..................... | G06N 3/006 |
| 2019/0066670 A1* | 2/2019 | White | .................... | G10L 15/22 |
| 2019/0087152 A1* | 3/2019 | Aggarwal | .............. | G06Q 10/10 |

\* cited by examiner

| Phone Number | Reserved? | Reservation Time Remaining | Communication Profile ID | Priority | Last Used Time | Last Received Number | Last Received Name |
|---|---|---|---|---|---|---|---|
| 1-800-555-XX06 | Available | | | 1 | Sept. 21, 2017, 11:29:22 PM | xxx-555-1234 | Stark, Kevin |
| 1-800-555-XX21 | Available | | | 2 | Sept. 21, 2017, 04:13:54 AM | xxx-555-5555 | Smith, John |
| 1-800-555-XX03 | Available | | | 3 | Sept. 22, 2017, 07:27:31 AM | xxx-555-9876 | Brown, Charlie |
| 1-800-555-XX11 | Available | | | 4 | Sept. 22, 2017, 11:29:22 PM | xxx-555-4321 | Lincoln, Abraham |
| ... | ... | ... | | ... | ... | ... | ... |
| ... | ... | ... | | ... | ... | ... | ... |
| 1-800-555-XX20 | Available | | | 27 | Sept. 22, 2017, 10:08:50 PM | xxx-555-9999 | Roosevelt, Eleanor |
| 1-800-555-XX08 | Reserved | 4 seconds | 11cc54d9 | 28 | Sept. 22, 2017, 10:14:27 AM | xxx-555-7777 | Washington, George |
| 1-800-555-XX09 | Available | | | 29 | Sept. 22, 2017, 10:14:31 AM | xxx-555-6546 | Jefferson, Thomas |
| 1-800-555-XX19 | Reserved | 19 seconds | 1f902a4c | 30 | Sept. 22, 2017, 10:14:42 AM | xxx-555-1616 | Arc, Joan |

1202

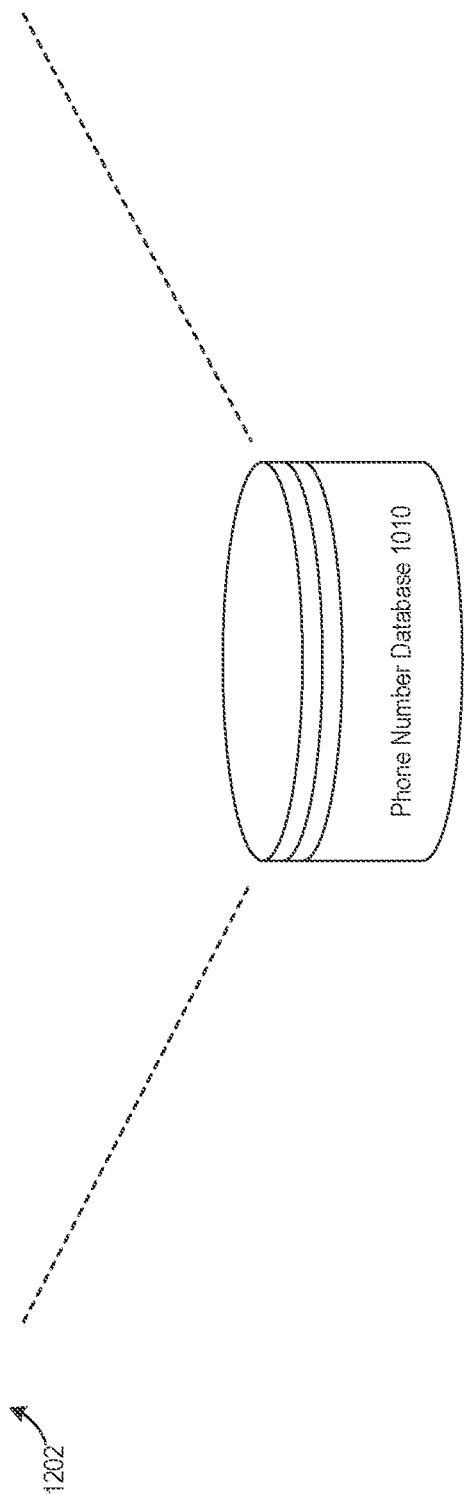

Phone Number Database 1010

FIG. 12

PHONE NUMBER VERIFICATION

BACKGROUND

Speech recognition systems have progressed to the point where humans can interact with computing devices by relying on speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also convert a user's speech into text data which may then be provided to various text-based software applications.

BRIEF DESCRIPTION OF DRAWINGS

For a more complete understanding of the present disclosure, reference is now made to the following description taken in conjunction with the accompanying drawings.

FIG. 12 illustrates data stored within a phone number database according to embodiments of the present disclosure.

DETAILED DESCRIPTION

Figure 1:
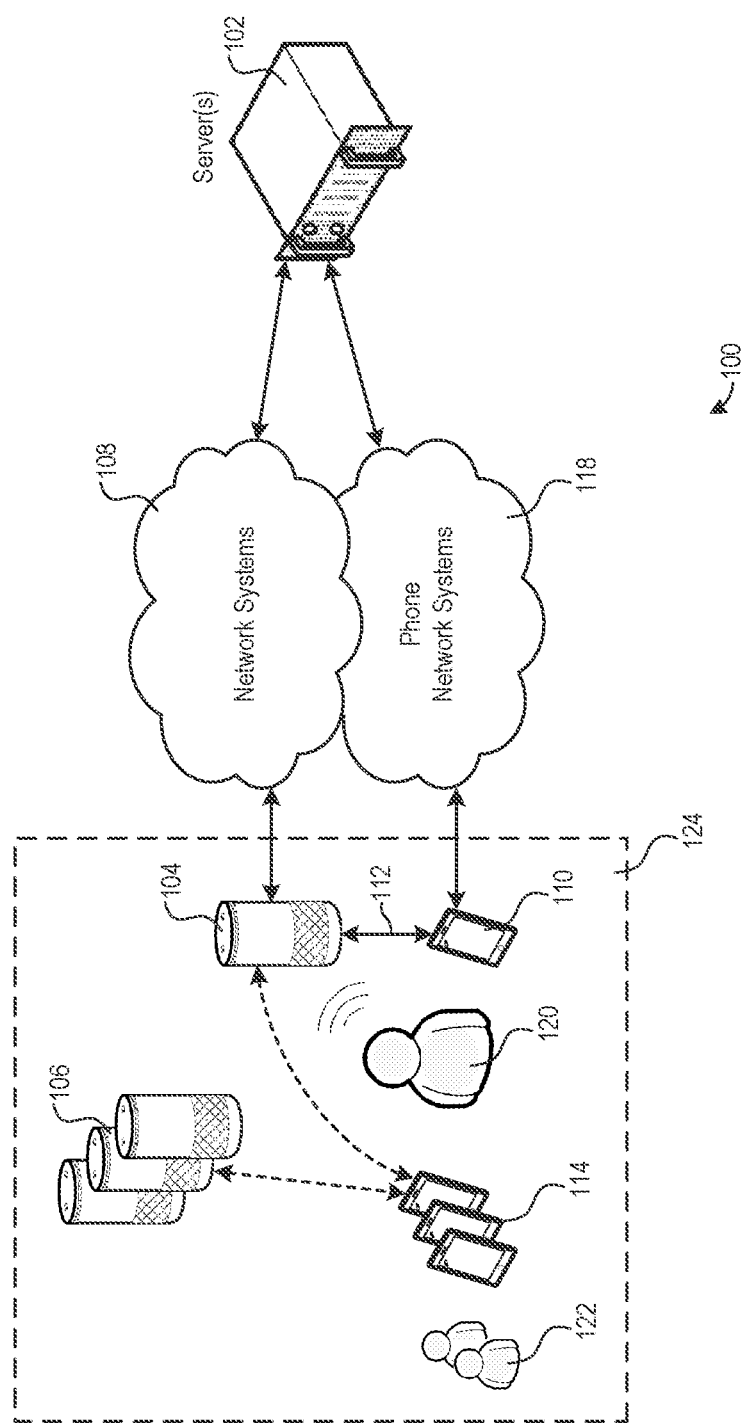
FIG. 1 illustrates a system according to embodiments of the present disclosure.

Speech processing systems may be used to perform speech processing and interpret voice instructions from a user. Additionally or alternatively, a speech processing system may be used in conjunction with a communications system to provide a user with an ability to communicate with other users of other devices (e.g., mobile devices and/or other electronic devices that are part of the communications system) over a network system via synchronous voice conversations (e.g., a phone call) or asynchronous voice messaging or text messaging. With such a communication system, once set up, the user can typically contact another user with a simple voice instructions such as, for example, "Alexa, call John" or "Alexa, send Mary a text."

In order for individual users with a multi-member household to be utilize the communication system, the communication system may generate a communication profile for the user. Part of generating the communication profile includes saving a phone number (e.g., a standard phone number or another device identifier that can be used to contact a user device) as associated with the communication profile. Associating the user's mobile device and/or the user's mobile device's phone number with the communication profile enables the communication system to utilize the mobile device's phone number when contacting other users and allows the communication system to contact the user via the mobile device. Further, associating the user's mobile device with the communication profile enables the communication system to save and utilize the contacts within the mobile device to allow the user to communicate with those contacts via the communication system rather than only their mobile device. A motivation exists to reduce the burden on the user in initiating and completing the process to generate a communication profile and associate their mobile device and/or phone number with their communication profile to enable more users within multi-member households to utilize the communication system. Further, a motivation exists to provide a process for associating their mobile device and/or phone number with the communication profile that is consistent with the voice-based character of the vast majority of the interactions with the speech processing system.

To make it easier for a user to generate a communication profile and associate their mobile device and/or phone number with their communication profile, a new process is provided in accordance with various embodiments. The new process eliminates the requirement for a user to install a specialized software application (e.g., a companion application) on the mobile device prior to generating the profile and associating their mobile device and/or phone number with their communication profile. Further, the new onboarding process reduces effort on part of the user for the communication system to receive the phone number for the mobile device and verify that the user has access to that mobile device corresponding to that phone number.

In operation, a user speaks an instruction to a device (e.g., a speech processing device) to contact another user (e.g., "Alexa, call John") or to enable use of the communication system ("Alexa, enable calling"). The device, which is within the physical home of the user or otherwise in physical proximity to the user, is a speech processing device and/or an end point device (e.g., such as an Amazon Echo, an Amazon Dot, or an Amazon Echo Show) that is connected to the larger speech processing system (e.g., Amazon Alexa voice processing system) via one or more network systems. The device sends the instruction to a server of the speech processing system, and the speech processing system determines that the instruction relates to the communication system. The speech processing system passes handling of the instruction to the communication system. The communication system determines that there is a need to generate a new communication profile and/or to associate a mobile device and/or a mobile device's phone number with the communication profile. The communication system communicates back to the device to initiate the process. In one approach, the device will output audible instructions to the user (e.g., via a speaker) instructing the user to connect his or her mobile device to the device via a network (e.g., a wireless local network connection such as Bluetooth). After the user's mobile device and the device are connected, the device will cause the user's mobile device to call a particular phone number that is assigned to or designated to the communication system 204 (i.e., such that placing a call to the particular phone number via a standard phone service would result in calling the communication system). The communication system will receive the inbound call to the phone number and will also receive the Automatic Number Identification (ANI) number and/or the Caller Identification (ID) number associated with the call. This ANI number or Caller ID number is the phone number assigned to the mobile device. The communication system then saves the ANI number or Caller ID phone number as associated with the new communication profile for the user. This process thereby enables the communication system to simultaneously collect the phone number for the mobile device and verify that the user has access to the mobile device associated with that phone number.

In some examples, the device (e.g., the speech processing device) then collects contact information within a phonebook data stored in the mobile device (e.g., phonebook data such as contacts, favorites, and call history) and sends the data to the communication system. The communication system then stores the data in a database as associated with the communication profile for the user. The device can also collect current data (e.g., current phonebook data) from the mobile device either periodically or on an as-needed basis, and can send the current data to the communication system. The communication system can then store the current data in the database as associated with the communication profile. In this manner, the user can communicate with individuals in the phonebook on his or her mobile device via the communication system.

By using the new process to associate a user's mobile device and/or phone number with a communication profile, certain benefits are realized. In particular, users are provided with a way to set up communication profiles within the communication system using voice interactions, which is the primary user interface type for the devices (e.g., speech processing device) that communicate with the speech processing system. Additionally, secondary household members may be able to generate communication profiles without first installing a specialized software application (e.g., a companion application) to set up the communication profile and enable use of the communication system. Further, because the new onboarding process does not require installation of the specialized software application (e.g., the companion application), users who do not have smartphones or other devices capable of downloading and installing the specialized software application (e.g., a companion application) or accessing a website will be able to utilize the communication system. Moreover, the communication system can updated phonebook data from a user's mobile device so that the user's contacts stored within the communication system remain up to date. These and other benefits will become readily apparent upon a full review of the following detailed description and the accompanying figures.

FIG. 1 shows a system 100 configured to collect and verify phone numbers for a mobile device in accordance with various embodiments. The system 100 may include a speech processing system that performs various functions according to received audible instructions from a user 120. The system may also include a communication system that enables a user 120 to communicate with other users via the system. The system 100 may include servers 102 that are configured to perform various functions described herein. For example, the servers 102 may implement all or portions of the speech processing system and the communication system as described herein. The servers 102 may be connected to a device 104 and/or other devices 106 via one or more network systems 108. A mobile device 110 (e.g., a cell phone, a smartphone, a tablet, or another electronic user device) may be capable of connecting to the device 104 via a network connection 112 (such as Bluetooth or a similar wireless local connection type). The term "mobile device" is used throughout the present disclosure, and is meant to encompass electronic devices and user devices that are generally capable of connecting to a network system and capable of communicating over that network system. Some other examples of "mobile devices" include computers, laptops, desktop computers, televisions, small appliances, vehicles, watches, and the like. Other user devices 114 may be connectable to the device 104 and/or to the other devices 106 using the same or similar types of network connections. The servers 102 may also be configured to receive phone calls via a phone network system 118. Portions or all of the phone network system 118 may be embodied within the network systems 108, or the phone network system 118 may be a separate network system from the network systems 108. The mobile device 110 and/or the other user devices 114 may be capable of contacting the server(s) 102, and specifically a communication system 204 provided by the server(s) 102, via the phone network system 118, for example, by placing a phone call to a phone number associated with or assigned to the communication system 204 via the phone network system 118. The communication system 204 may be able to receive information about phone calls received over the phone network system 118 to phone numbers assigned to the communication system 204.

The mobile device 110 may belong to or otherwise be associated with the user 120. Similarly, the other user devices 114 may belong to or otherwise be associated with the user 120 or other users 122. The mobile device 110 and other user devices 114 may be part of a household 124, or otherwise be associated with the household 124, as well. In some approaches, the other users 122 represent other members of the household 124. In certain embodiments, the device 104 and the other devices 106 are all collocated within the household 124 or otherwise associated with the household 124. The device 104 and the other devices 106 may be interconnected via a local area network (LAN), for example, via a WiFi network, or may be interconnected to each other using direct or mesh network connections between the device 104 and the other devices 106.

In operation, the user 120 can speak audible instructions to the device 104 to cause the system 100 to perform different functions. One such function is provided by a communication system 204 provided by the system 100, wherein the communication system 204 enables communication with other individuals and devices via the system 100 (e.g., instead of solely via the mobile device 110). However, as discussed above, to enable use of the communication system 204, the communication system 204 may generate a new communication profile for the user and associate the user's mobile device 110 and/or phone number of the mobile device 110 with the communication profile.

Figure 2:
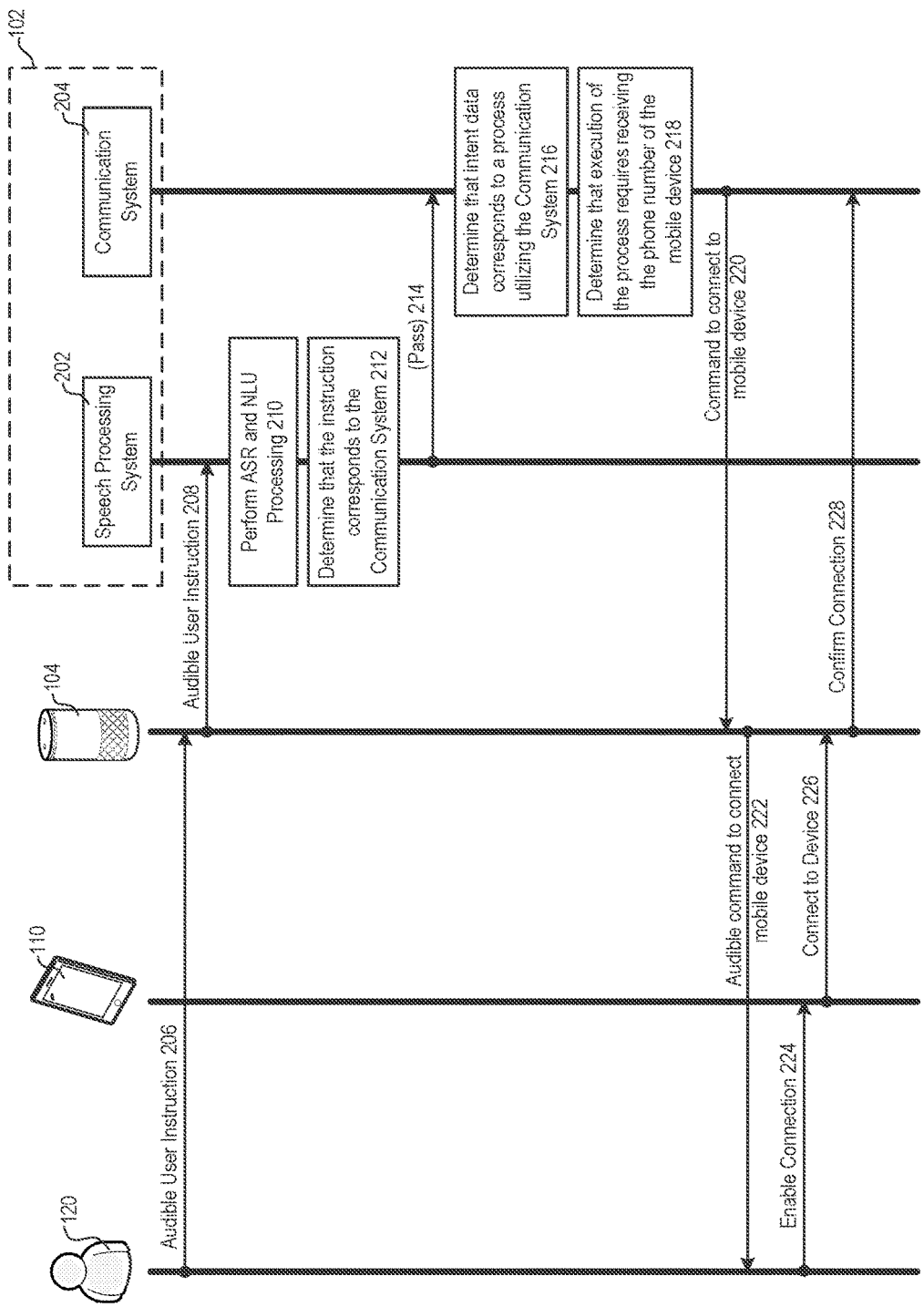
FIG. 2 is a signal flow diagram illustrating various steps performed by the system.
Figure 3:
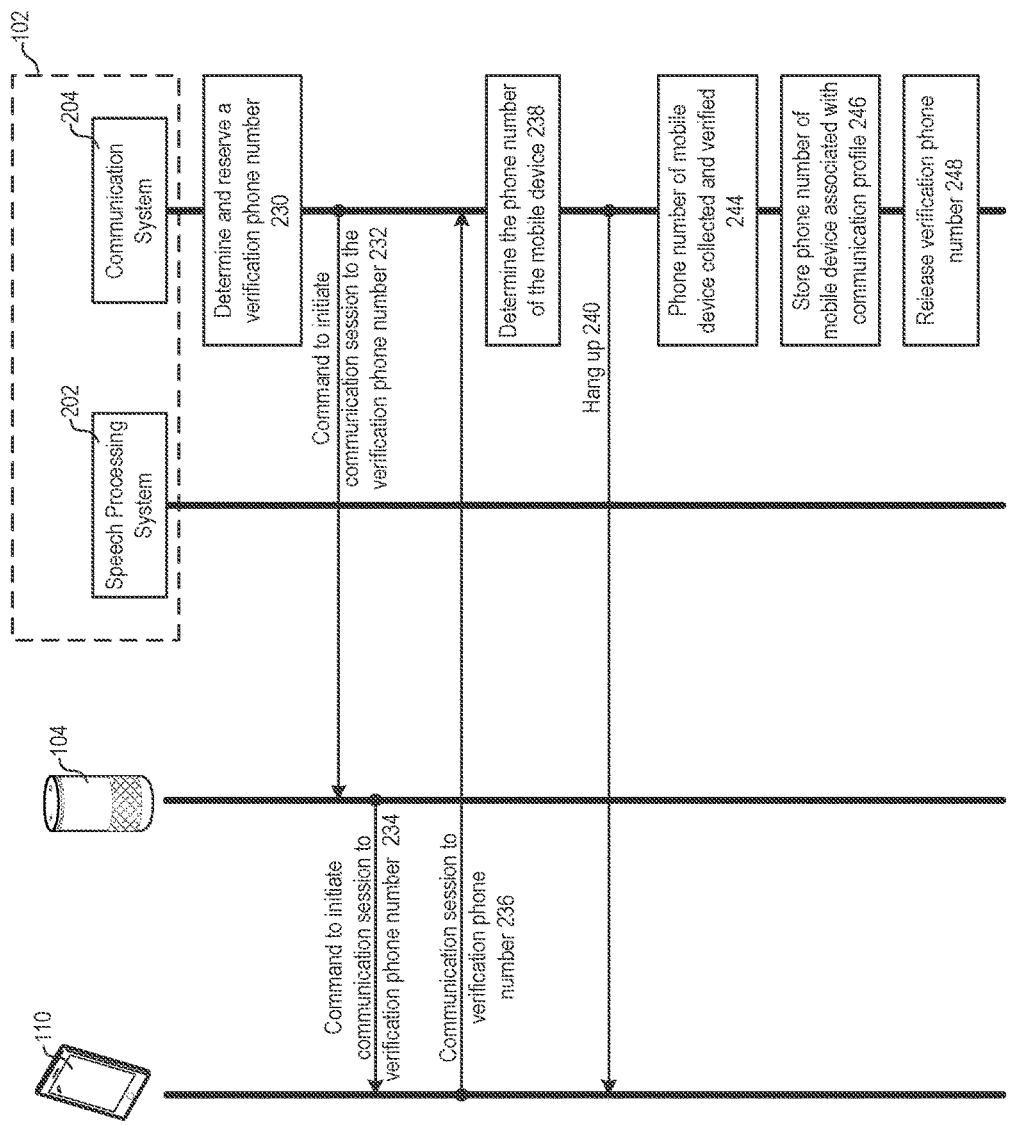
FIG. 3 is another signal flow diagram illustrating various steps performed by the system.
Figure 4:
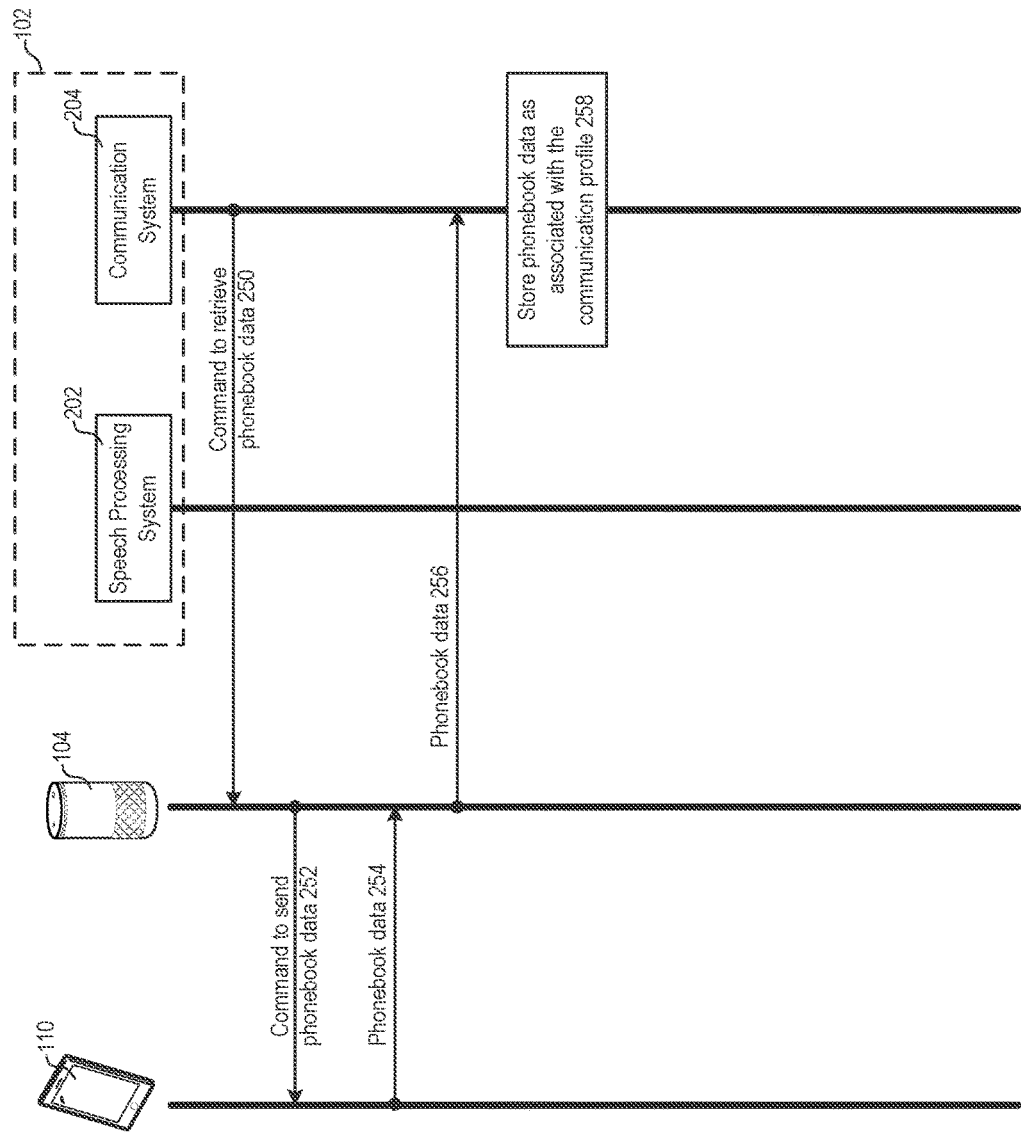
FIG. 4 is another signal flow diagram illustrating various steps performed by the system.

FIGS. 2-4 are signal flow diagrams illustrating various steps performed by, and communications between, the mobile device 110, the device 104, the server(s) 102 (including the speech processing system 202 and/or the communication system 204), to perform the new process for associating a phone number with a communication profile in accordance with various embodiments. Although the steps and communications are illustrated in a particular order, many of the steps may be executed in a different order and/or simultaneously. Other variations are possible, as well.

In FIG. 2, a user 120 utters an audible user instruction. In one example, the audible user instruction is related to the communication system provided by the system 100 (e.g., "Alexa, call John" or "Alexa, enable calling"). The device 104 receives (206) the audible user instruction. For example, a microphone 1612 of the device 104 may capture the audible user instruction and the device 104 may generate audio data representing audio spoken by the user 120, specifically the audible user instruction. The device 104 sends (208) the audio data representing the audio spoken by the user 120 to the servers 102, which may include transmission of the audio data including the audible user instruction to the servers 102. The servers 102, and, more specifically, a speech processing system 202 included as part of the servers 102, receives the audio data representing the audio spoken by the user and may perform Automatic Speech Recognition (ASR) and Natural Language Understanding (NLU) processing (210) on the received audio data to determine the content of the audio data. More particularly, the speech processing system 202 may generate intent data and/or entity data corresponding to the audible user instruction included within the audio data. As a result of the speech processing system 202 performing ASR and NLU processing (210) on the audio data representing the audio spoken by the user, the speech processing system 202 may generate intent data representing that the audible user instruction that corresponds to the communication system 204, and more particularly to an intent to utilize the communication system. The ASR and NLU processing, as well as the speech processing system 202, are described in greater detail in connection with FIGS. 8 and 9.

The speech processing system 202, and more particularly an orchestrator system 814, may determine, using the intent information generated during ASR and NLU processing (210), that the audio data representing the audible user instruction corresponds to the communication system 204 and may pass (214) the execution of the audible user instruction to the communication system 204. More specifically, the speech processing system 202 may send the generated intent data to the communication system, for example, via one or more network systems or busses. In one example, the orchestrator system 814 may determine to pass (214) or send data, specifically the intent data and/or entity data, regarding the audible instruction to a communication system controller 1000 of the communication system 204 (see FIG. 10).

The communication system 204 receives the intent data regarding the audio data representing the audible user instruction from the speech processing system 202 via the orchestrator system 814. More specifically, a communication system controller 1000 (see FIG. 10) receives the intent data regarding the audible user instruction. The communication system controller 1000 determines (216) that the intent data corresponds to a process involving utilization of the communication system 204. For example, the communication system 204 may determine that the intent data indicates an express intention to enable the communication system for a particular user (e.g., a primary account user or a secondary account user). Alternatively, the communication system 204 may determine that the intent data corresponded to an instruction to contact a person via the communication system 204. In one approach, the communication system controller 1000 may include a table or glossary of intents that it may receive from the speech processing system. Each intent within the table of intents may correspond to a particular action or process that the communication system 204 may perform. For example, an intent of "place call" may cause the communication system controller 1000 to initiate a process to place a phone call or initiate another communication session to an entity associated with the received intent.

The communication system 204 also determines (218) that execution of the process involving utilization of the communication system 204 requires receiving the phone number associated with the user's mobile device 110 and storing the phone number of the mobile device 110 within the communication profile database 1502 as associated with the communication profile for the user 120. That is, the communication system 204 may determine that the audio data represents an intent to add a phone number of a mobile device 110 to a communication profile associated with the first device 104. The communication system 204 may review user communication profile information 1504 stored in the communication profile database 1502 and associated with the device 104 or user to determine that a communication profile does not exist for the user 120 or the device 104, or that the communication profile is missing an associated phone number. For example, upon receiving an intent that utilizes the communication system 204, the communication system controller 1000 may cause a communication profile manager 1004 to search a communication profile database 1502 for a communication profile that is associated with either the device 104 or the user 120. If the communication profile manager 1004 fails to find such a communication profile, the communication system controller 1000 will determine that a communication profile for the user and/or for the device 104 should be created prior to the communication system 204 providing communication sessions. Further, in another embodiment, the communication profile manager 1004 may find a communication profile, but may fail to find a phone number associated with the communication profile. Accordingly, in some approaches, the communication system controller 1000 will determine that the phone number for the user 120 (e.g., the phone number for a mobile device 110 of the user 120) should be received and associated with the communication profile for the user and/or for the device 104.

Figure 15:
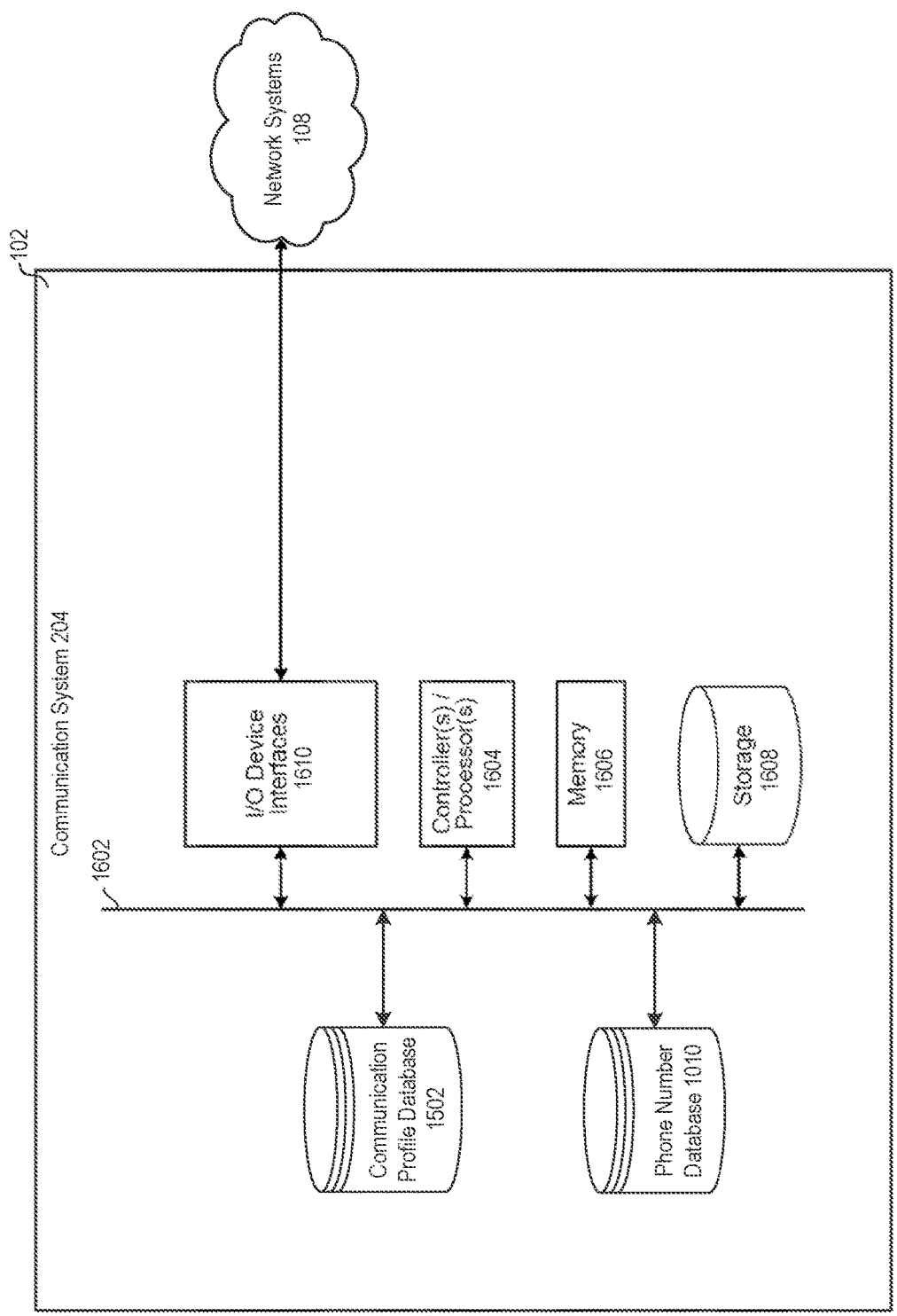
FIG. 15 is another block diagram conceptually illustrating example components of a communication system according to examples of the present disclosure.

The communication system 204 may then initiate the process to receive a phone number for the user 120 and/or their mobile device 110 and associate that phone number with a communication profile. If a communication profile does not yet exist for the device 104 or the user 120, the communication profile manager 1004 may create a communication profile for the user 120 and associate the communication profile with the device 104 (e.g., as the primary account or a secondary account for the device 104 and/or the household 124). The communication profile manager 1004 may create a new entry within the communication profile database 1502, for example, using a template communication profile. The communication profile manager 1004 may complete as much information within the template communication profile using information it may have access to or that has been provided to it. Referring briefly to FIG. 15, which shows an example of communication profile database 1502, the communication profile may include entries such as data regarding any devices associated with the communication profile such as, for example, a device identification, an IP address, a Bluetooth identification, a phone number, a device type, a verified flag, Amazon account information (e.g., used for shopping), Alexa account information (e.g., used for speech processing), etc. Each communication profile 1504 may also include data such as phonebook data from a user device, including names of contacts, names of favorites, call history, and a last update date/time. The communication profile manager 1004 may store the new communication profile within the communication profile database 1502.

Due to the need to receive the phone number from the mobile device, the communication system 204 may communicate a command (220) to the device 104 to output or otherwise provide an instruction (e.g., an audible instruction) to the user 120 to connect their mobile device 110 to the device 104. For example, a device interface 1002 of the communication system 204 (see FIG. 10) may send a command, for example, via the speech processing system 102, that causes the device 104 to output the audible instruction (222). The device 104 may receive the command 220 and may output or otherwise provide the audible instruction (222) to the user 120 to connect their mobile device 110 to the device 104. For example, the device 104 may audibly instruct (e.g., using speaker 1614, see FIG. 13) the user 120 to enter settings within their mobile device 110, enable Bluetooth communication, and connect to the device 104, possibly providing the particular Bluetooth device name of the device 104 (e.g., "Kitchen Echo"). The user 120 may subsequently enable Bluetooth on the mobile device 110 and select (224) a connection to the device 104. The mobile device 110 may responsively connect (226) to the device 104 via the Bluetooth connection. Optionally, the device 104 may send (228) a connection confirmation to the communication system 204. Although Bluetooth is discussed here, other local wireless connections are possible and are contemplated by this disclosure.

FIG. 3 is a continuation of the signal flow diagram of FIG. 2, discussed above. In FIG. 3, the communication system 204, and in particular, a phone number manager 1008 (see FIG. 10) may determine, select, and/or reserve (230) a verification phone number from a set of available verification phone numbers available to the communication system 204. Further detail regarding selecting the verification phone number is provided in FIG. 7. The set of verification phone numbers may be a collection or pool of phone numbers owned by the entity providing the communication system, assigned to the communication system 204, and designated to contact the communication system 204. In one example, the verification phone numbers are toll-free numbers (beginning with 800, 888, 877, 866, 855, 844, or 833). Toll-free numbers are particularly useful with the present system 100 as they do not result in a phone charge being assessed to the phone account of the mobile device 110. Further, toll-free numbers are also useful because, at least in the United States, Automatic Number Identification (ANI) data is provided to the recipient of a toll-free call during the phone call, even if the originating caller has caller ID blocked because AIN operates independently of caller ID. Thus, when the communication system 204 receives a phone call on one verification phone number from the set of verification phone numbers, the communication system 204 will receive the phone number assigned to the device or phone line that placed the phone call via the phone network systems 118 or other network systems across which the call propagated.

Figure 10:
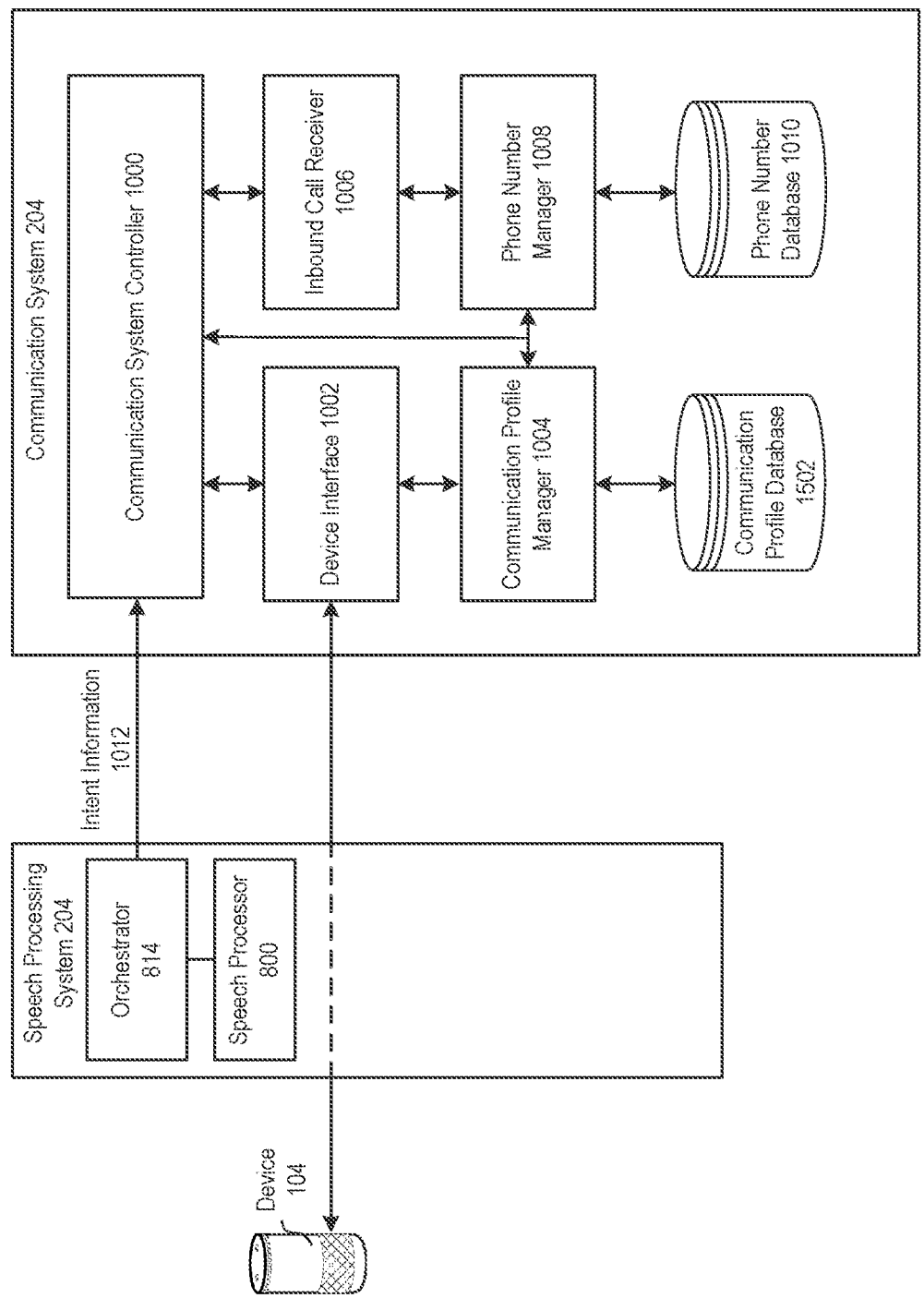
FIG. 10 is a diagram of components of a communication system according to embodiments of the present disclosure.

Further detail regarding receiving the phone number of an inbound phone call placed to one of the set of verification phone numbers is provided in relation to FIG. 10.

The communication system 204 may then send a command (232) to the device 104 to cause the mobile device 110 to initiate a communication session (e.g., a call) from the mobile device 110 to the selected verification phone number. The device 104 receives this command (232) and subsequently sends a command (234) to the mobile device 110 to initiate the communication session (e.g., call) to the verification phone number. For example, if the device 104 and the mobile device 110 are connected using a Bluetooth connection, the device 104 may transmit a Bluetooth Hands-Free Profile (HFP) command to the mobile device 110 to cause the mobile device 110 to place the call to the verification phone number over the phone network systems 118. The mobile device 110 may responsively initiate the communication session (e.g., place a phone call) (236) using the verification phone number. The mobile device 110 may initiate a communication session in a variety of ways. In one example, initiating the communication session includes the mobile device 110 placing a phone call. Placing or initiating a phone call by the mobile device may entail using any variety of known phone network systems 118 implementing a variety of known phone protocols (e.g., Public Switched Telephone Network (PSTN) systems or other land-line type telephone and data network systems, and/or cellular network systems or other wireless type telephone and data network systems) in an attempt to establish an audio link between the mobile device 110 and a recipient device assigned to the verification phone number or a recipient device coupled to a phone line assigned to the verification number. In another example, placing or initiating a phone call by the mobile device may entail using Voice over Internet Protocol ("VoIP"), Internet telephony, broadband telephony, or broadband phone service utilizing digitized signals conveyed over Internet Protocol (IP) networks, such as the Internet. Other known networks, protocols, and methods of placing or initiating phone calls are also contemplated.

The verification phone number, as with all of the verification phone numbers within the set of verification phone numbers, is assigned to or designated to the communication system 204. The communication system 204, and more particularly, an inbound call receiver 1006 of the communication system 204 (see FIG. 10), is assigned as the destination for phone calls made to the verification phone numbers such that the phone network system 118 (or other network systems 108) route phone calls made to the verification phone numbers to the inbound call receiver 1006. As with the mobile device 110, the inbound call receiver 1006 may interface with either standard phone network systems (such as PSTN network systems, cellular and/or other wired or wireless phone network systems and protocols), VoIP phone network systems, or other known phone network systems or protocols to receive phone calls made to the verification phone numbers. The inbound call receiver 1006 of the communication system 204 receives the inbound call (236) to the verification phone number from the mobile device 110 via the phone network system 118. After the call is connected from the mobile device 110 to the inbound call receiver 1006, the inbound call receiver 1006 determines (238) data representing the inbound call such as, for example, the phone number of the associated with the inbound call. For example, during the ringing period, a phone network service provider may provide the inbound call receiver 1006 with Caller ID (CID) data and/or Automatic Number Identification (ANI) data corresponding to the inbound call (236) encoded within signals communicated to the inbound call receiver 1006. The inbound call receiver 1006 may receive these signals and may decode the signals to receive the CID or ANI data according to known methods. The inbound call receiver 1006 can send the phone number included within the received CID data and/or ANI data to the phone number manager 1008, and the phone number manager 1008 can store the received phone number in a storage database or cache included in a memory. In one approach, the phone number manager 1008 stores the phone number within a phone number database 1010 as the last received phone number for an inbound call received at the verification number (see FIG. 12). Additionally, with respect to CID signals, the phone network service provider may send a name (if available) associated with the phone number within the CID data sent to the inbound call receiver 1006. The inbound call receiver 1006 may also send the received name data included within the received CID data to the phone number manager 1008, and the phone number manager 1008 can store the received name data in the storage database. In one approach, the phone number manager 1008 stores the received name within the phone number database 1010 as the last received name for an inbound call received at the verification number (see FIG. 12).

Once the inbound call receiver 1006 receives (238) the phone number of the mobile device 110, e.g., via CID or ANI data, the inbound call receiver 1006 may optionally hang up, deny, or end (240) the inbound call from the mobile device 110.

The phone number manager 1008 of the communication system 204 determines that the inbound call receiver 1006 received the inbound phone call to the verification phone number within a predetermined reservation period of time (e.g., within 20 seconds, though other periods of time may be used). The phone number manager 1008 can make this determination by beginning a timer upon reserving the verification phone number, or upon successfully sending the command to initiate the communication session to the verification phone number (232), and determining if it receives phone number data from the inbound call receiver 1006 for that particular verification phone number prior to expiration of the timer. Alternatively, the phone number manager 1008 can set a reservation expiration time for the particular verification phone number within the phone number database 1010 as a time in the future that is set according to the predetermined reservation period of time (e.g., 20 seconds in the future). If the phone number manager 1008 receives the phone number data from the inbound call receiver 1006 for that particular verification phone number prior to the reservation expiration time, the phone number manager 1008 determines that the inbound call receiver 1006 received the inbound phone call to the verification phone number within the predetermined reservation period of time. Further detail is provided in connection with FIG. 7.

The phone number manager 1008 also determines (244) that the inbound call (236) received at the verification phone number (the one reserved at step 230) corresponds to the specific mobile device 110 of the user 120 that is connected to the device 104. The phone number manager 1008 can make this determination because the verification phone number was reserved for receiving the inbound call from the specific mobile device 110 for a predetermined reservation period of time (e.g., 20 seconds). During that predetermined reservation period of time, the communication system 204 cannot not utilize the reserved verification phone number for another process to capture a different phone number from a different mobile device. Thus, because the verification phone number was reserved for exclusive use to receive the phone number via the inbound call from the specific mobile device 110, the phone number manager 1008 determines with a high degree of certainty that the inbound call received on that specific verification phone number was from the specific mobile device 110. As is discussed below, the communication system 204 may also verify (e.g., with audible communication to the user 120 via the device 104) that the phone number (and name, if applicable) received via the inbound phone call correctly correspond to the user's mobile device 110 and/or the user 120. Further, the phone number manager 1008 also determines with reasonable certainty that the user 120 has access to the mobile device 110 assigned to the received phone number because both the user 120 and the mobile device 110 must be in relatively close proximity to the device 104, and the mobile device 110 must be configured to connect to the device 104.

The communication system 204 can store (246) the phone number received via the inbound call as associated with the communication profile information 1504 stored in the communication profile database 1502 for the particular user 120. More particularly, the phone number manager 1008 can cause the communication profile manager 1004 to save the phone number data and/or name data received via the inbound call as associated with the communication profile for the user 120. For example, the communication profile manager 1004 can add data to the communication profile for the user corresponding to the phone number data for the mobile device 110 and/or the name data received via the inbound phone call. The communication system 204 can also designate (248) the verification phone number as available for use in a subsequent process to receive a phone number for a different mobile device. For example, as is shown in FIG. 12, the phone number manager 1008 can update the phone number database 1010 to indicate that the particular verification phone number used in the above described process is now available instead of reserved.

So configured, the communication system 204 can obtain the phone number for the mobile device 110 associated with the user 120 with little effort on part of the user 120 other than connecting their mobile device 110 to the device 104.

FIG. 4 is another example signal flow diagram illustrating various steps performed by, and communications between, the mobile device 110, the device 104, and the servers 102 (including a speech processing system 202 and/or a communication system 204), to perform additional steps including a new process to receive phonebook data and associate the phonebook data with the communication profile in accordance with various embodiments. In certain approaches, the signal flow diagram of FIG. 4 is a continuation of the signal flow diagrams shown in FIGS. 2 and 3 and represents steps that would be performed immediately or soon after completion of the steps shown in FIG. 3.

The communication system 204 sends a command (250) to the device 104 to receive phonebook data from the mobile device 110, which command is received by the device 104. More specifically, the device interface 1002 may send the command (250) to the device 104 via the network systems 108 and/or via the speech processing system 202. The device 104 then sends a command (252) to the mobile device 110 to send phonebook data stored within the mobile device 110 to the device 104. The phonebook data may include contacts stored within the mobile device 110, favorites, and call history of the mobile device 110, including incoming, missed, and outgoing calls. In one approach, if the device 104 and the mobile device 110 are connected using a Bluetooth connection, the device 104 may transmit a Bluetooth Phonebook Access Profile (PBAP) command to the mobile device 110. The mobile device 110 responsively sends (254) its phonebook data to the device 104 via the Bluetooth connection or another local wireless network, which phonebook data is received by the mobile device 110. The device 104 in turn sends (256) the phonebook data to the communication system 204, and more specifically, to the device interface 1002. The device interface 1002 receives the phonebook data and sends the phonebook data to the communication profile manager 1004. The communication system 204, and more specifically, the communication profile manager 1004 causes the phonebook data (including contacts, favorites, and call history) to be stored in the communication profile database 1502 as associated with the communication profile 1504 for the particular user 120. For example, the communication profile manager 1004 may store the data corresponding to the phonebook data for the mobile device 110 in particular portions of the communication profile. For example, contacts within the phonebook data from the mobile device 110 may be stored within a list of contacts within the communication profile; favorites within the phonebook data from the mobile device 110 may be stored within a list of favorites within the communication profile; and a call history stored within the phonebook data from the mobile device 110 may be stored within a call history within the communication profile Once stored, the communication system 204 can allow the user 120 to utilize the communication system 204 to contact and communicate with contacts that are in the phonebook of the mobile device 110 by accessing contact information for the contacts stored within the communication profile for the user.

Optionally, the communication system 204 may communicate a message to the mobile device 110. The message may be a text message or other message type, and may include or provide access to additional information regarding the communication system 204. For example, the additional information may include instructions on use of the communication system, a confirmation that the phone number for the mobile device is associated with the user's communication profile, and/or legal information such as a legal disclaimer regarding the communication system 204.

The device 104 may provide an audible dialog or conversation flow with the user 120 to effect the steps described above. An example conversation flow may be as follows:
Kevin: Alexa, enable calling
[This kicks off a Bluetooth connection flow]
Alexa: Go to the Bluetooth settings on your phone and choose Echo-6A
[Kevin goes into the Bluetooth settings of his iPhone and selects Echo-6A]
Alexa: Now connected to Kevin's iPhone. Can I make a quick, free phone call to verify your number?
Kevin: Yes
Alexa: Is your phone number 555-123-4567?
Kevin: Yes
Alexa: Is your name Kevin Stark?
Kevin: Yes
Alexa: When I have access to your address book you can call or message people by their names. Can I have access to your address book?
Kevin: Yes
Alexa: Okay Kevin, you're all set. You can now use Alexa to call people from your phone address book. Say Alexa call Jane to call Jane or Alexa answer to answer incoming calls. Say Alexa, enable calling to set up other members of your family.

In the above example conversation flow, the communication system 204 audible verified for the user that the phone number the communication system 204 received for the mobile device 110 during the process was the correct phone number. Although this step is not required, it can serve additional verification purposes. Further, the example conversation flow was initiated with a direct instruction to explicitly set up the communication system ("Alexa, enable calling"). However, if the communication system had not been set up at all for the device 104, any utterance that would normally trigger a calling or messaging flow (e.g., "Alexa, call John") can initiate the process to generate a communication profile and/or retrieve a phone number of a mobile device and, in certain embodiments, provide a conversation flow similar to the above example conversation flow.

In an alternative embodiment, the communication system 204 may not receive or may not store the phone number for the mobile device 110. In such an embodiment, the communication system 204 may only want to verify that a user 120 has access to the mobile device without receiving knowledge of the actual phone number of the mobile device 110. In this alternative approach, verification occurs as discussed above with respect to FIG. 3, and below with respect to FIG. 7, but simply omits steps related to receipt or storage of the phone number of the mobile device 110.

Figure 5:
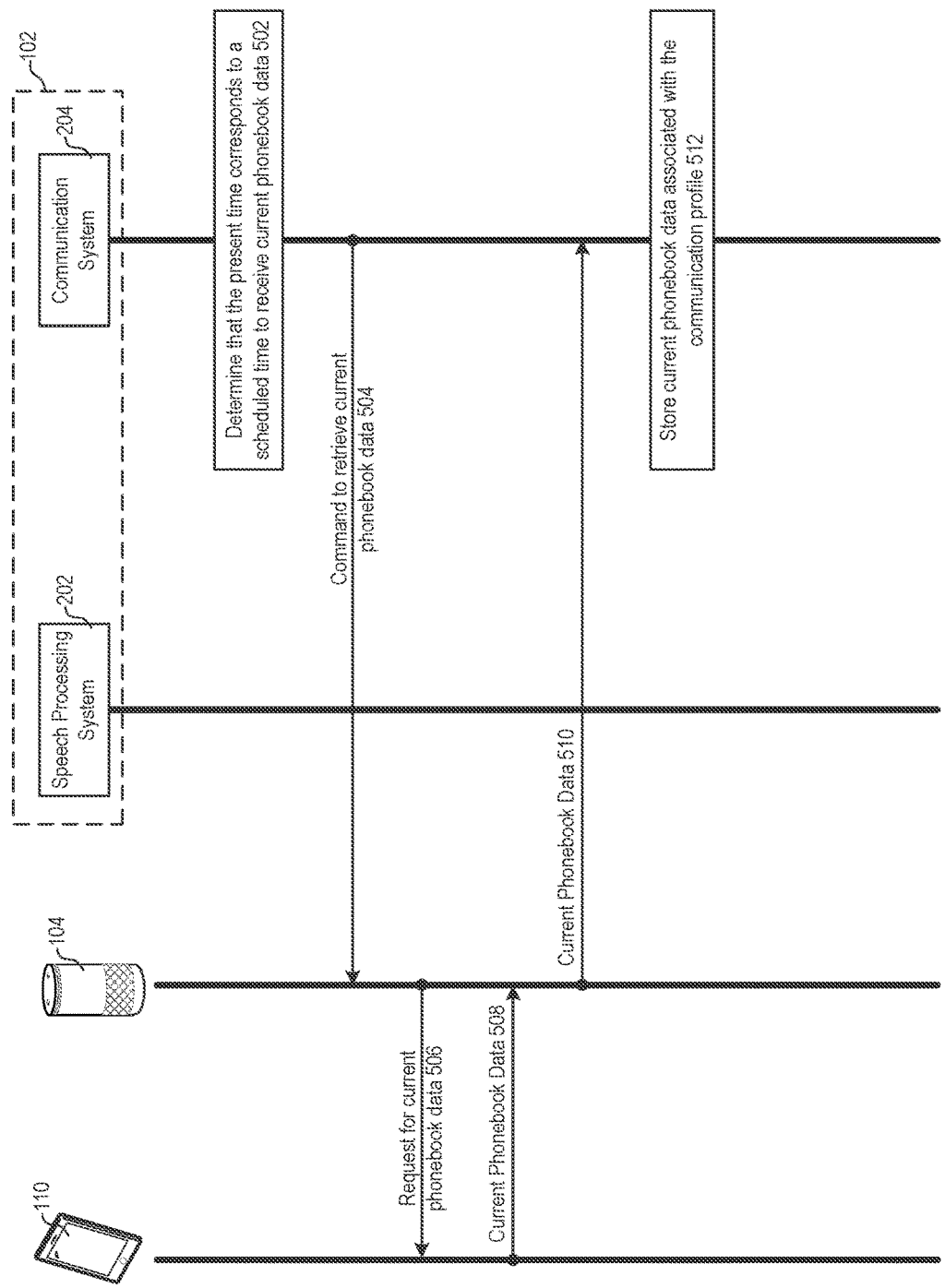
FIG. 5 is another signal flow diagram illustrating various steps performed by the system.

FIG. 5 is another example signal flow diagram illustrating various steps performed by, and communications between, the mobile device 110, the device 104, and the servers 102 (including the speech processing system 202 and/or the communication system 204), to perform a periodic phonebook data maintenance procedure in accordance with various embodiments. In order to allow the user 120 to utilize up-to-date contact information stored within their mobile device 110 for communications using the communication system provided by the communication system 204, the communication system 204 can perform a periodic update of the phonebook data stored within the mobile device 110. In a periodic update approach, the communication system 204 periodically checks for current phonebook data on the mobile device 110. For example, the communication system 204 may perform a phonebook update procedure at or near the same time every day (e.g., 3:00 AM, when the user 120 and their mobile device 110 are more likely to be located within the household 124 and near the device 104 or the other devices 106). The communication system 204 determines (502) that a present time corresponds to a scheduled time to request current phonebook data form the mobile device 110. Alternatively, the communication system 204 may determine that a predetermined amount of time has passed since a previous phonebook update procedure has successfully occurred. For example, the communication system 204, and more specifically, the communication profile manager 1004, may store within a database, such as the communication profile database 1502, a last update time for the phonebook data of the mobile device 110 associated with the communication profile.

The communication system 204 may initiate the process to receive current phonebook data from the mobile device 110 by sending a command (504) to the device 104 to receive current phonebook data from the mobile device 110. The command may include a unique device identifier or network identifier associated with the mobile device 110. In some embodiments, the command (504) may include a time limit up to which to receive current phonebook data (e.g., phonebook data updated only within the past two days). The device 104 receives the command (504) to retrieve current phonebook data from the mobile device 110. The device 104 may then issue a command (506) to the mobile device 110 to send current phonebook data stored within the mobile device 110. In one approach, if the device 104 and the mobile device 110 are connected using a Bluetooth connection, the device 104 may send a Bluetooth Phonebook Access Profile (PBAP) command to the mobile device 110 to receive current phonebook data. The current phonebook data may include any new contacts recently added, deleted, or modified, e.g., within a particular timeframe. For example, the current phonebook data may include all or a portion of the contact list that has been updated in the mobile device 110 since a previous data retrieval; all or a portion of a favorites list that has been updated in the mobile device 110 since the previous data retrieval; and/or all or a portion of a call history that has been updated in the mobile device 110 since a previous data retrieval. The mobile device 110 responsively sends (508) current phonebook data to the device 104, for example, over the Bluetooth connection or another local wireless connection. The device 104 then sends (510) the current phonebook data to the communication system 204. Specifically, the device interface 1002 receives the current phonebook data from the device 104. The communication system 204 can then cause the communication profile manager to store (512) the updated phonebook data (including contacts, favorites, and call history) within the communication profile 1504 stored in communication profile database 1502 for the particular user 120. Storing the updated phonebook data may include adding newly added contacts, removing deleted contacts, and modifying information for modified contacts.

Figure 6:
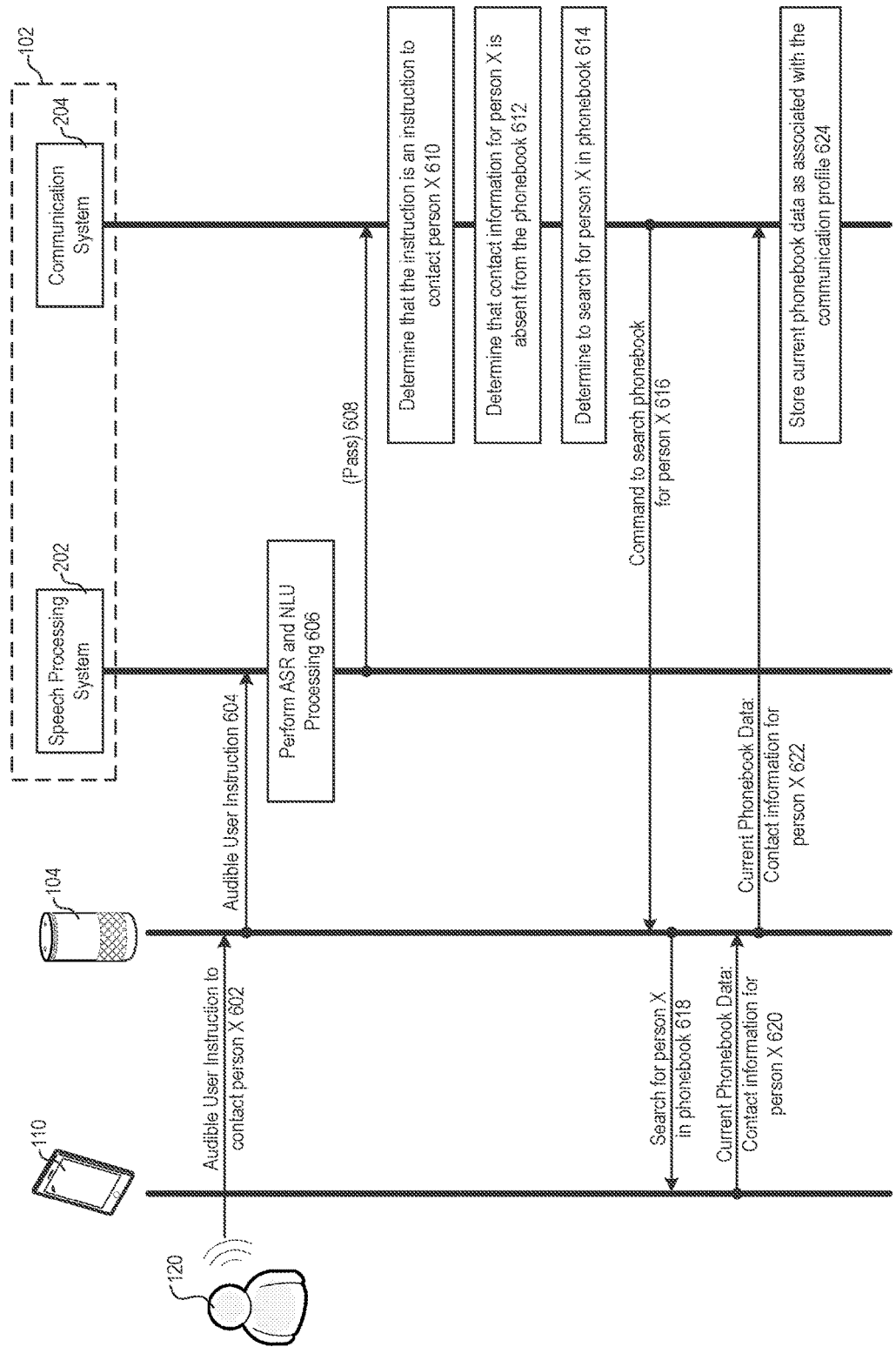
FIG. 6 is another signal flow diagram illustrating various steps performed by the system.

FIG. 6 is another example signal flow diagram illustrating various steps performed by, and communications between, the mobile device 110, the device 104, and the servers 102 (including the speech processing system 202 and/or the communication system 204), to perform an on-demand phonebook data maintenance procedure in accordance with various embodiments. In an on-demand approach, the communication system 204 may update the phonebook data stored within a communication profile for a user 120 if it receives an audible user instruction from the user 120 to initiate a communication session with a contact not stored within the phonebook data associated with the communication profile 1504 stored in the communication profile database 1502. For example, a user may utter an audible user instruction to contact person X (e.g., "Call John Smith"). The device 104 may receive (602) or sense (e.g., via microphone(s) 1612) the audible user instruction to contact person X. As discussed above, and in further detail below, the device 104 can convert the audible user instruction into audio data representing the audio spoken by the user 120, specifically the audible user instruction. The device 104 sends (604) the audio data representing the audible user instruction to the servers 102, and in particular to the speech processing system 202. Speech processing system 202 in turn performs ASR and NLU processing (606) on the received audio data representing the audible user instruction to determine that the audible user instruction relates to the communication system 204. Execution of the instruction is passed (608) to the communication system 204. For example, the speech processing system 202 may generate intent data and entity data corresponding to the audio data representing the audible user instruction. The speech processing system 202 may then send the intent data and the entity data to the communication system 204, and in particular, to the communication system controller 1000. The communication system 204 receives the intent data and the entity data from the speech processing system 202 and determines (610) that the instruction is an instruction to contact person X (e.g., "John Smith"). For example, the intent data may represent "place call" and the entity data may include "John Smith." The communication system 204 also reviews the phonebook data associated with the user communication profile information 1504 and determines (612) that person X is absent from the phonebook data stored in the communication profile (e.g., the contact list of the phonebook data stored within the communication profile does not include a "John Smith"). As with the periodic approach, at this point, the communication system 204 may determine to initiate a search for updated phonebook data on the mobile device 110. In particular, the communication profile manager 1004 may determine (614) to search for person X in the phonebook data on the mobile device 110.

The communication system 204 may initiate the process to search for person X in the phonebook within the mobile device 110 by sending a command (616) to the device 104 to search the phonebook on the mobile device 110 for person X. The command may include a unique device identifier or network identifier associated with the mobile device 110. The device 104 receives the command (616) to search the phonebook on the mobile device 110 for person X. The device 104 may then send a command (618) to the mobile device 110 to search phonebook data stored within the mobile device 110 for person X. In one approach, if the device 104 and the mobile device 110 are connected using a Bluetooth connection, the device 104 may transmit a Bluetooth Phonebook Access Profile (PBAP) command to the mobile device 110 to search the phonebook on the mobile device 110 for person X (e.g., "John Smith"). The mobile device 110 responsively searches through its phonebook data stored on the mobile device 110 for person X. If the mobile device 110 finds a person X within the phonebook data, the mobile device 110 sends (620) the contact information for person X as current phonebook data to the device 104, for example, over a Bluetooth connection or another local wireless network connection. This current phonebook data may include only the contact information for person X, or may include other data, such as any recent calls made to person X or other more general current phonebook data as discussed above. The device 104 then sends (622) the contact information for person X (e.g., current phonebook data) to the communication system 204. The communication system 204 can then cause the communication profile manager 1004 to store (624) the contact information for person X as current phonebook data within the communication profile 1504 stored in communication profile database 1502 for the particular user 120. Storing the contact information for person X may include adding a new contact for person X or modifying contact information for person X within the communication profile for the user 120.

Continuing with the on-demand approach, with the updated phonebook data including the contact information for person X, the communication system 204 then determines that person X is now present in the phonebook data stored in the user communication profile 1504 (e.g., recently added as part of the on-demand updating process). The communication system 204 subsequently attempts to contact person X via a communication session over network systems 108. Additionally, the communication system 204 may utilize current phonebook data (whether received via periodic updates or on-demand updates), including, for example, recent calls, to aid in contact disambiguation. For example, if the current phonebook data shows that the user 120 recently called "John Smith" using the mobile device 110, and if the user 120 provides an audible user instruction "Alexa, call John," the communication system 204 may provide "John Smith" as a first suggested contact name during a disambiguation query ("did you want me to call John Smith?").

If a periodic update is currently in progress as is shown in FIG. 5 (that is, while the first device 104 is receiving updated phonebook data from the mobile device 110 during its scheduled time), and if a user attempts to utilize the communication system via the first device 104 to communicate with a contact not present within the phonebook data stored within the communication profile database 1502, the communication system 204 may instruct the first device 104 to halt the periodic update and instead proceed with an on-demand updated and search the phonebook on the mobile device, as is discussed with respect to FIG. 6. That is to say, in some embodiments, if there is a conflict between performing a slower periodic update of the phonebook data (FIG. 5) and performing a relatively quicker on-demand update (FIG. 6), the on-demand update can be prioritized. This allows the communication system to be more user-focused by being reactive to newly received user instructions. Upon completion of the on-demand update, the interrupted periodic update may resume or may start over.

During the phonebook update process, if the mobile device 110 is not present or not connected to the device 104 (e.g., the user 120 and their mobile device 110 are not within the household or near the device 104, or the Bluetooth connection on the mobile device 110 is off), the device 104 will return a phonebook update fail message to the communication system 204 indicating a failure to capture updated phonebook data. The communication system 204 may set a timer to attempt the phonebook update process again at a later time.

If a household 124 includes multiple devices, such as device 104 and other devices 106, the communication system 204 may selectively command one device at a time within the household 124 to attempt to receive current phonebook data from the mobile device 110. In one example, if the communication system 204 instructed all devices 104 and 106 to connect to the mobile device 110 at the same time, a race condition may occur. In one approach, the communication system 204 may utilize a presence signal associated with each device 104 or 106. The presence signal indicates that a user 120 is present near a particular device 104 or 106. With the assumption that a user 120 often carries or is otherwise near their mobile device 110, the device 104 or 106 indicated by the presence signal may provide a good initial device of the devices 104 and 106 with which to attempt to retrieve the updated phonebook data. Thus, for example, if device 104 indicates, via the presence signal, that the user 120 is near device 104, the communication system 204 may send the command (506) to retrieve the updated phonebook data to that device 104 first. If the device 104 returns a failed update attempt, then the communication system 204 may simply retry the phonebook update process with each one of the other devices 106 within the household 124, one at a time, until the communication system 204 successfully receives updated phonebook data or all devices 104 and 106 have been tried.

In another approach, the devices 104 and 106 may be paired to the mobile device 110 such that, if the mobile device 110 is near to the device 104 with its Bluetooth enabled, the device 104 can detect the presence of the mobile device 110 using the Bluetooth signal. These signals offer at least one other signal that the communication system 204 can utilize to determine which device 104 or 106 within a household 124 can be utilized to receive current phonebook data from the mobile device.

Figure 7:
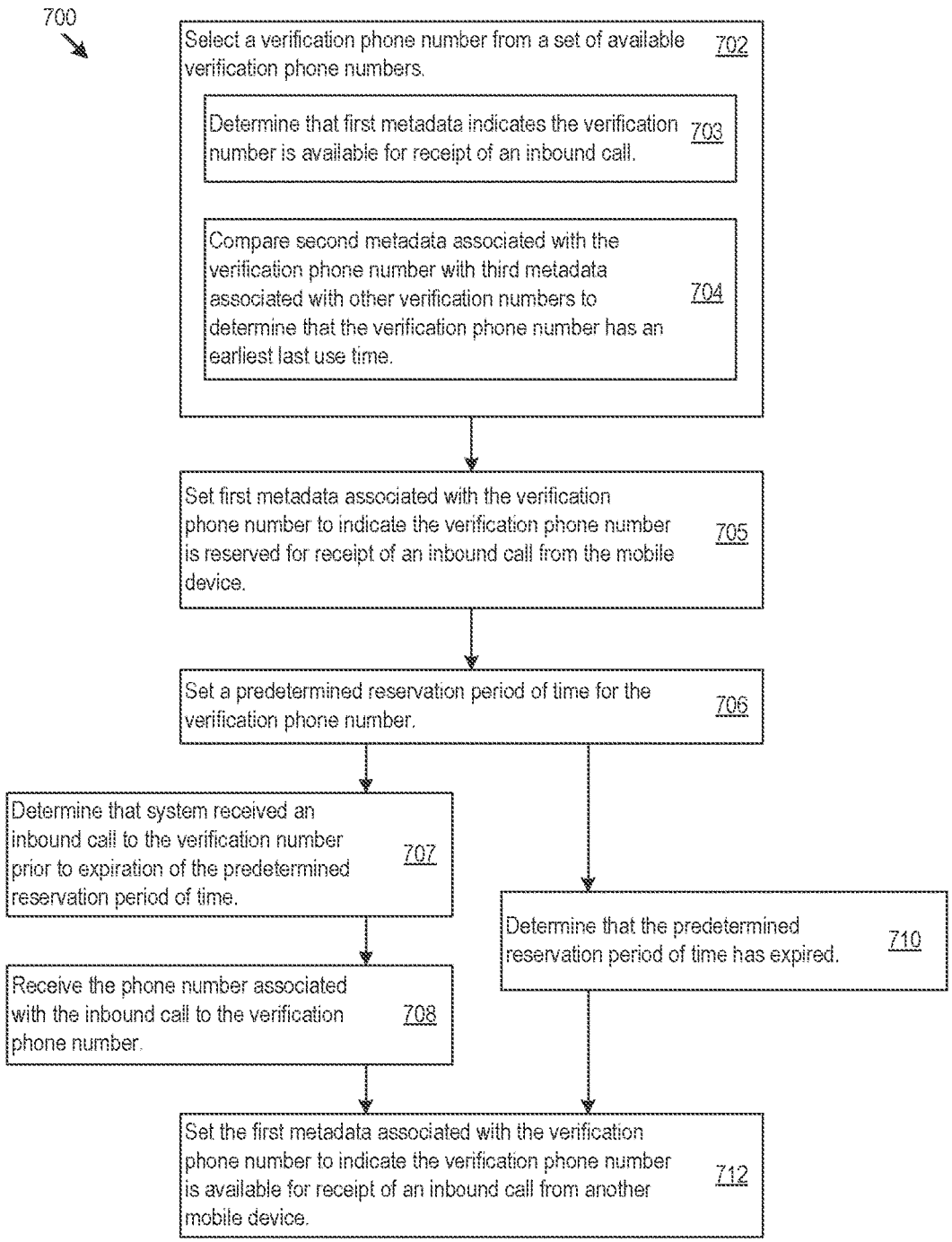
FIG. 7 is a flow chart of logic that may be implemented by the system.

FIG. 7 is a flow diagram of logic 700 that may be executed by the communication system 204, or more specifically, by the phone number manager 1008 of the communication system 204 to manage a set of verification phone numbers. The steps illustrated in FIG. 7 provide additional detail to the steps shown in FIG. 3 and serve to supplement those steps. In discussing FIG. 7, reference is also made to the example phone number list 1202 stored in the phone number database 1010. The phone number manager 1008 may select (702) a verification phone number from the set of available verification phone numbers available to the communication system 204. In certain examples, to select the verification phone number, the phone number manager 1008 may review metadata regarding the set of verification phone numbers within a phone number list (e.g., example phone number list 1202) stored in the phone number database 1010. The phone number manager 1008 may determine that first metadata associated with a particular verification phone number indicates that the verification phone number is available for receipt of an inbound call from a mobile device.

Referring briefly to FIG. 12, which shows an example phone number list 1202 stored within the phone number database 1010 in accordance with various embodiments, the phone number list 1202 includes multiple items of metadata associated with each verification phone number. The various items of metadata correspond to statuses or other data relating to each of the verification phone numbers. One particular item of metadata is a "reserved" status indicator. The "reserved" status indicator metadata indicates the current status of the particular verification phone number as reserved or available. If a verification phone number is marked as reserved within the phone number list 1202, that verification phone number is exclusively reserved for a particular process of receiving a phone number for a particular communication profile and is unavailable for use with another process to receive a phone number for a different communication profile. Conversely, if a verification phone number is marked as available, then the verification phone number is available for receipt of an inbound call from the mobile device 110. As such, in one example, the phone number manager 1008 may determine (703) that the metadata (e.g., the reserved status indicator) associated with a first verification phone number indicates that the first phone number is available for receipt of the inbound call from the mobile device 110.

Although a predetermined reservation time period is set for each reservation of a verification phone number, to further decrease the chance of collisions between two or more mobile devices attempting to call a particular verification phone number, it is beneficial in some embodiments to maximize the time between reservations of each verification phone number. Thus, in some embodiments, the phone number list 1202 may be organized according to a last used time, giving more recently used verification numbers a lower priority than verification numbers that have seen a longer time since last being reserved. For example, the example phone number list 1202 may be organized so that a verification number with a last used time furthest in the past is on top (or on bottom) and has a highest priority to be selected (e.g., is next in line to be reserved). Alternatively, the phone number list 1202 may include a priority indicator metadata that indicates a reservation priority order set out from oldest to newest last used time. By setting a reservation order for the verification phone numbers in accordance with this priority, the risk of colliding inbound phone numbers on a single verification number is reduced. In this approach, the phone number manager 1008 may compare (704) metadata representing a last used time for a first verification phone number, with other metadata for a different verification phone number to determine which verification number has an earliest last use time within the set of verification numbers. The phone number manager 1008 may simply compare the last use times or may utilize the priority indicator. Upon determining the verification phone number that is both available and has the oldest last use time, the phone number manager 1008 can select that verification number to be reserved for the process of receiving the phone number of the mobile device 110 via an inbound call from the mobile device 110. In other approaches, the phone number manager 1008 may select verification numbers from the list at random, in a circular fashion, in a first-in-first-out manner, or a last-in-first-out manner.

The phone number manager 1008 may then reserve the selected verification phone number for use in a particular process to receive the phone number from the mobile device 110. In one approach, the phone number manager 1008 sets the first metadata (the reserved indicator) associated with the selected verification phone number to indicate that the verification phone number is reserved for receipt of an inbound call from the mobile device. As discussed above, marking the verification phone number as reserved within the phone number list 1202 provides for exclusive use of the verification phone number for a limited time (the predetermined reservation period of time) and prevents that verification phone number from being selected for use in a different process for a limited time.

The phone number manager 1008 may set (706) a predetermined reservation period of time for the selected verification phone number. As discussed above, a timer (shown in the example phone number list 1202 in a "reservation time remaining" indicator) associated with the verification phone number and corresponding to a reservation time remaining may be set to an initial time corresponding to the predetermined reservation period of time. For example, the reservation period of time may represent a maximum time (e.g., 20 seconds) that the verification phone number can be reserved for a particular process to receive an inbound call. The predetermined reservation period of time may be set by a system designer according to the needs of their particular application. In another example embodiment, a reservation end time is set to a time in the future that is set according to the predetermined reservation period of time (e.g., 20 seconds in the future). If the inbound call receiver 1006 does not receive an inbound phone call to the particular verification phone number prior to the timer running out or the present time passing the reservation end time, the phone number manager 1008 will end the reservation, resulting in a failure to receive the inbound phone call at that specific verification phone number, and a failure to capture the phone number of the mobile device 110. For example, the phone number manager 1008 may determine (710) that the predetermined reservation period of time has expired. As a result, the phone number manager 1008 may set the first metadata (i.e., the reserved indicator) associated with the verification phone number to indicate that the verification phone number is available for receipt of an inbound call from another mobile device. The phone number manager 1008 may initiate a repeat attempt or a set of repeat attempts to have the mobile device 110 call the same or a different verification phone number according to the teachings above. The device interface 1002 may also provide a message to the device 104 via speech processing system 202 to provide an indication of failure and/or repeating attempts.

Conversely, the phone number manager 1008 may determine (707) that the inbound call receiver 1006 received an inbound call to the verification phone number prior to expiration of the predetermined reservation period of time, for example, by receiving (708) phone number data associated with the inbound call to the verification phone number received by the inbound call receiver 1006 prior to expiration of the predetermined reservation period of time. Responsive to either steps 707 and 708 or step 710, the phone number manager 1008 may set (712) the first metadata (e.g., the reserved indicator) associated with the verification phone number to indicate the verification phone number is available for receipt of an inbound call from another mobile device. For example, the phone number manager 1008 may set the reserved indicator to "available" within the phone number list 1202 stored in the phone number database 1010.

In certain embodiments, a primary account holder user will receive notifications whenever a new communication system profile has been established for the device 104 or other devices 106 within the household 124. For example, the primary account holder user may receive an email, a text message, or a message via the software application alerting them that the new communication profile has been created. The primary account holder user may be able to manage the communication profiles established within the household 124, for example, via the software application. Further, the primary account holder user may be able to configure settings for the communication system so as to require approval by the primary account holder user (or another adult user) prior to creating any new communication profiles for new users on the device 104 or other device 106 within the household 124.

So configured, users are provided with a way to set up the communication system using voice interactions, being the primary method of communicating with the device 104 or 106. Additionally, other household members are not forced to install a software application to set up the communication system. Moreover, the communication system 204 can now contact users that do not have the specific software application installed on their mobile devices, for example, by using text messaging. Additionally, the communication system 204 can utilize up-to-date phonebook data from the mobile device 110 so as to appear as if the contacts are "magically" synced. Additionally, a Presence System that may use a presence signal, as discussed above, can be improved by receiving data regarding the Bluetooth signals from mobile device 110 and/or other user devices 114 with Bluetooth enabled. Because the user communication profile 1504 may include a Bluetooth identification for each mobile device 110 or other user devices 114, the Presence System can better determine where a user 120 is, or at least where a particular mobile device 110 is. For example, a "find my phone" feature may be implemented to find a mobile device 110 located within the household 124.

The following description and accompanying figures provide additional detail regarding various aspects and features of the system 100 generally. The system 100 may operate using various speech processing components as described in FIGS. 8 and 9. The various components illustrated may be located on a same or different physical devices. Communication between various components illustrated in FIGS. 8 and 9 may occur directly or across a network system) 108. An audio capture component, such as a microphone (or array of microphones) of the device 104 (or other devices 106), captures or senses input audio 802 corresponding to a spoken utterance. For example, a user 120 may utter an instruction "Alexa, call John Smith." The device 104, using a wakeword detection component 804, processes audio data corresponding to the input audio 802 to determine if a keyword (such as a wakeword, e.g., "Alexa") is detected in the audio data. Following detection of a wakeword, the device 104 sends audio data 806, corresponding to the utterance, to the server(s) 102 for processing. The audio data 806 may be output from an acoustic front end (AFE) 808 located on the device 104 prior to transmission, or the audio data 806 may be in a different form for processing by a remote AFE 808, such as the AFE 808 located with an ASR component 810 of the server(s) 102.

The wakeword detection component 804 works in conjunction with other components of the device 104, for example a microphone to detect keywords in audio data corresponding to the input audio 802. For example, the device 104 may convert input audio 802 into audio data, and process the audio data with the wakeword detection component 804 to determine whether speech is detected, and if so, if the audio data comprising speech matches an audio signature and/or model corresponding to a particular keyword.

The device 104 may use various techniques to determine whether audio data includes speech. Some embodiments may apply voice activity detection (VAD) techniques. Such techniques may determine whether speech is present in audio data based on various quantitative aspects of the audio data, such as a spectral slope between one or more frames of the audio data; energy levels of the audio data in one or more spectral bands; signal-to-noise ratios of the audio data in one or more spectral bands; or other quantitative aspects. In other embodiments, the device 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio data to one or more acoustic models in speech storage, which acoustic models may include models corresponding to speech, noise (such as environmental noise or background noise), or silence. Still other techniques may be used to determine whether speech is present in audio data.

Once speech is detected in the audio data, the device 104 may use the wakeword detection component 804 to perform wakeword detection to determine when a user intends to speak an instruction to the device 104. This process may also be referred to as keyword detection, with the wakeword being a specific example of a keyword (e.g., "Alexa"). Specifically, keyword detection is typically performed without performing linguistic analysis, textual analysis, or semantic analysis. Instead, audio data is analyzed to determine if specific characteristics of the audio data match preconfigured acoustic waveforms, audio signatures, or other data to determine if the incoming audio data "matches" stored audio data corresponding to a keyword.

Thus, the wakeword detection component 804 may compare audio data to stored models or data to detect a wakeword. One approach for wakeword detection applies general large vocabulary continuous speech recognition (LVCSR) systems to decode audio signals, with wakeword searching conducted in resulting lattices or confusion networks. LVCSR decoding may require relatively high computational resources. Another approach for wakeword spotting builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in a decoding graph, and the decoding output is further processed to make the decision on keyword presence. This approach can be extended to include discriminative information by incorporating a hybrid deep neural network (DNN)-HMM decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected in the audio data, the device 104 may "wake" and begin transmitting audio data 806 corresponding to input audio 802 to the server(s) 102, and particularly to the speech processing system 202, for speech processing (e.g., for purposes of executing an instruction in the speech). The audio data 806 may include data corresponding to the wakeword, or the portion of the audio data corresponding to the wakeword may be removed by the device 104 prior to sending the audio data 806 to the speech processing system 202. In the above example, the audio data 806 may include the instruction "call John Smith."

Figure 8:
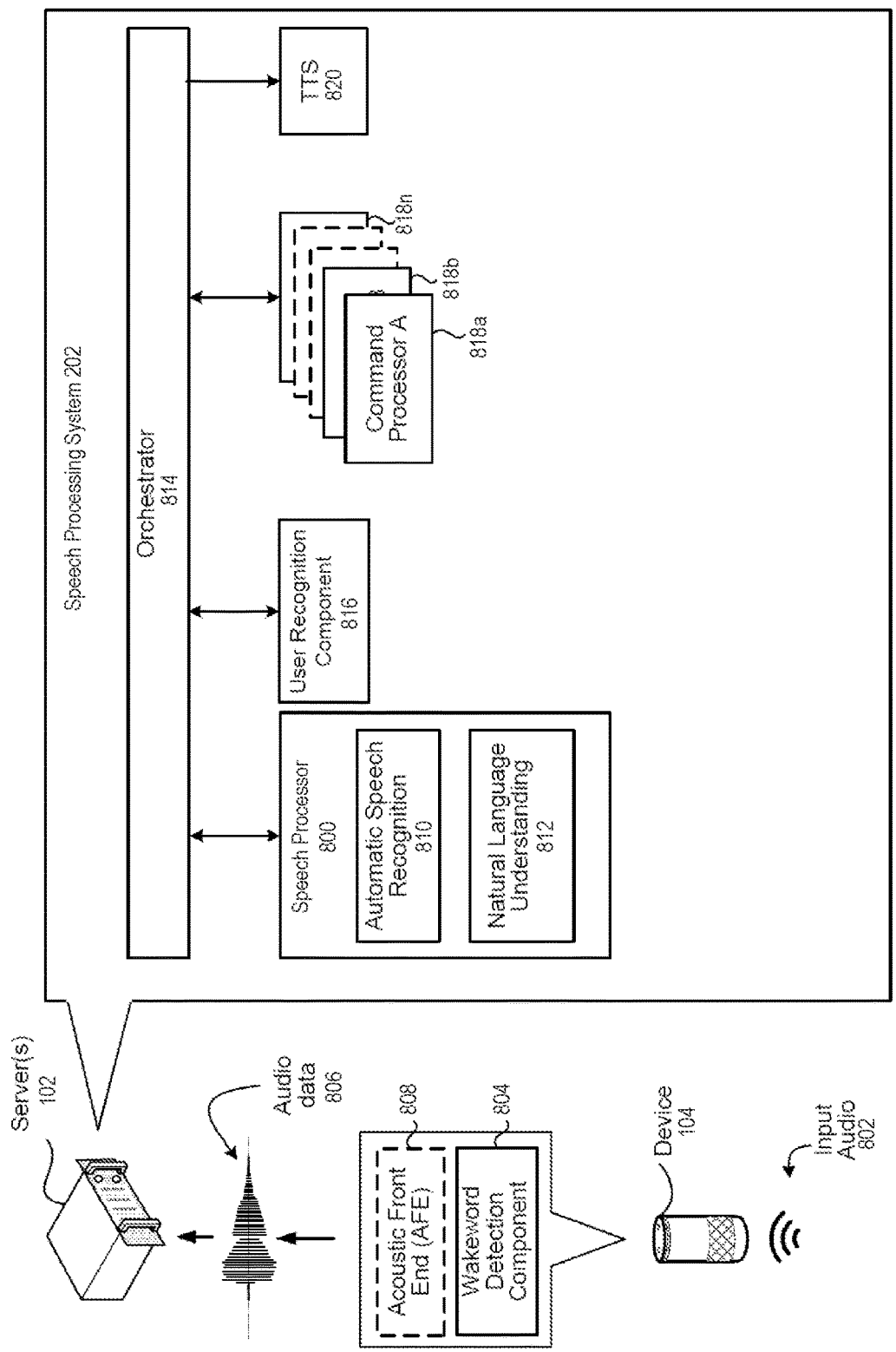
FIG. 8 is a diagram of components of a speech processing system according to embodiments of the present disclosure.
Figure 9:
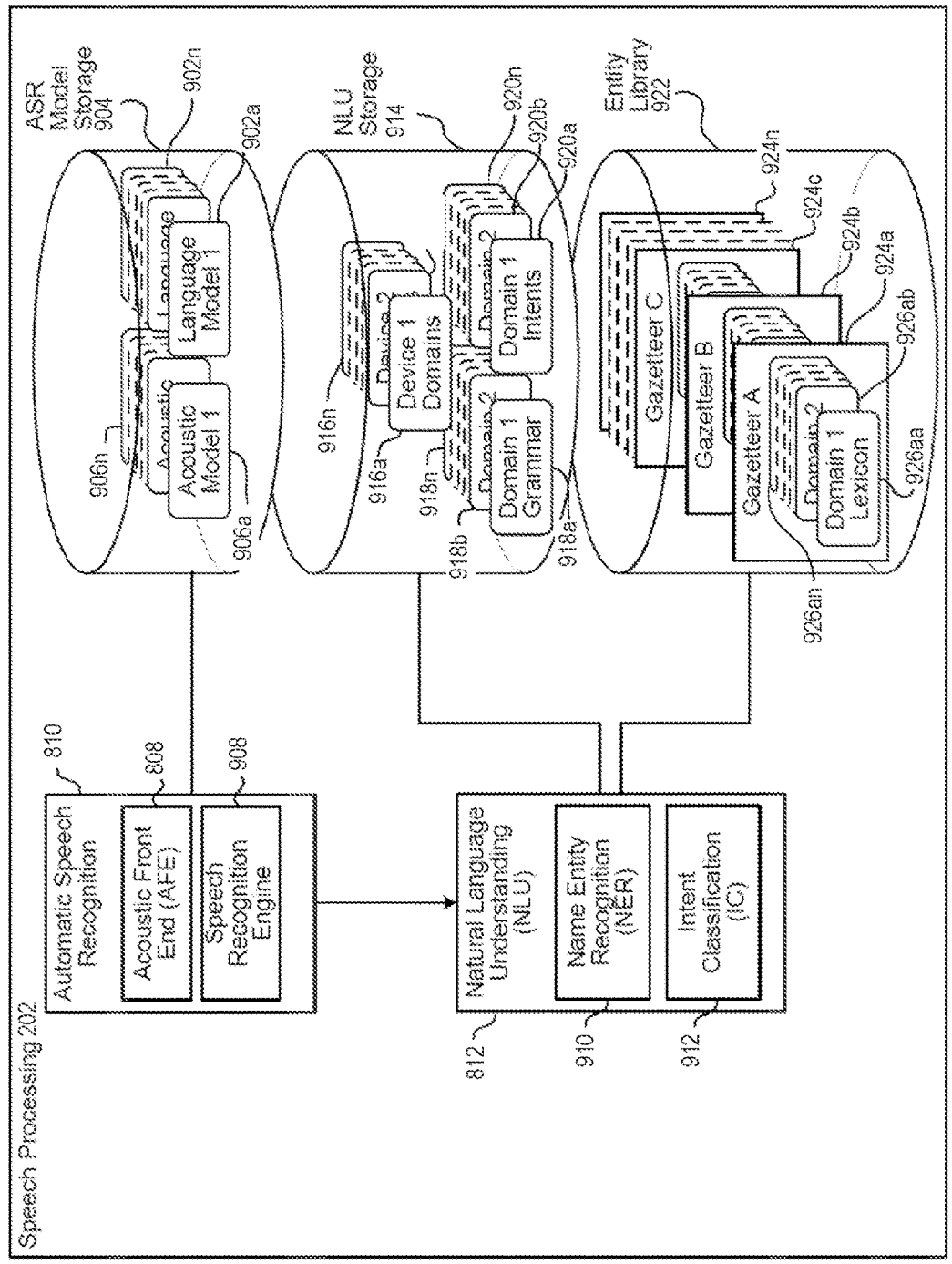
FIG. 9 is a diagram of additional components of a speech processing system according to embodiments of the present disclosure.

Upon receipt by the speech processing system 202, an orchestrator component 814 sends the audio data 806 to a speech processor 800, and namely an ASR component 810 of the speech processor 800. The ASR component 810 transcribes the audio data 806 into text data representing words of speech contained in the audio data 806. Continuing with the above example, the ASR components 810 may transcribe the audio data 806 into the text words "call," "John," and "Smith." The text data may then be used by other components for various purposes, such as executing system commands, inputting data, etc. With reference to FIG. 8, a spoken utterance in the audio data 806 is input to a processor configured to perform ASR, which then interprets the spoken utterance based on a similarity between the spoken utterance and pre-established language models 902 stored in an ASR model knowledge base (i.e., an ASR model storage 904). For example, the ASR component 810 may compare the audio data 806 with models for sounds (e.g., subword units or phonemes) and sequences of sounds to identify words that match the sequence of sounds spoken in the utterance of the audio data 806.

The different ways a spoken utterance may be interpreted (i.e., the different hypotheses) may each be assigned a respective probability/confidence score representing a likelihood that a particular set of words matches those spoken in the utterance. The confidence score may be based on a number of factors including, for example, a similarity of the sound in the spoken utterance to models for language sounds (e.g., an acoustic model 906 stored in the ASR model storage 904), and a likelihood that a particular word that matches the sound would be included in the sentence at the specific location (e.g., using a language model 902 stored in the ASR model storage 904). Thus, each potential textual interpretation of the spoken utterance (i.e., hypothesis) is associated with a confidence score. Based on the considered factors and the assigned confidence score, the ASR component 810 outputs the most likely text data corresponding to the audio data 806. The ASR component 810 may also output multiple hypotheses in the form of a lattice or an N-best list with each hypothesis corresponding to a confidence score or other score (e.g., such as probability scores, etc.).

The server(s) 102 including the ASR component 810 may include an AFE 808 and a speech recognition engine 908. The AFE 808 transforms audio data 806 into data for processing by the speech recognition engine 908. The speech recognition engine 908 compares the speech recognition data with acoustic models 906, language models 902, and other data models and information for recognizing the speech conveyed in the audio data 806. The AFE 808 may reduce noise in the audio data 806 and divide the digitized audio data 806 into frames representing time intervals for which the AFE 808 determines a number of values (i.e., features) representing qualities of the audio data 806, along with a set of those values (i.e., a feature vector or audio feature vector) representing features/qualities of the audio data 806 within each frame. In one configuration, each audio frame includes 25 ms of audio data and the frames start at 10 ms intervals resulting in a sliding window where adjacent audio frames include 15 ms of overlapping audio data. Many different features may be determined, as known in the art, and each feature represents some quality of the audio data 806 that may be useful for ASR processing. A number of approaches may be used by the AFE 808 to process the audio data 806, such as mel-frequency cepstral coefficients (MFCCs), perceptual linear predictive (PLP) techniques, neural network feature vector techniques, linear discriminant analysis, semi-tied covariance matrices, or other approaches known to those skilled in the art.

The speech recognition engine 908 may process data output from the AFE 808 with reference to information stored in the ASR model storage 904. Alternatively, post-AFE processed data (e.g., feature vectors) may be received by the device executing ASR processing from another source besides the internal AFE 808. For example, the device 104 may process audio data 806 into feature vectors (e.g., using an on-device AFE 808) and transmit the feature vector data to the server(s) 102, across the network system) 108, for ASR processing. Feature vector data may arrive at the server(s) 102 encoded, in which case it may be decoded prior to processing by the processor executing the speech recognition engine 908.

The speech recognition engine 908 attempts to match received feature vectors to language phonemes and words as known in the stored acoustic models 906 and language models 902. The speech recognition engine 908 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving a likelihood that the ASR component 810 will output text data representing speech that makes sense grammatically.

The speech recognition engine 908 may use a number of techniques to match feature vectors to phonemes, for example using HMMs to determine probabilities that feature vectors may match phonemes. Sounds received may be represented as paths between states of the HMM and multiple paths may represent multiple possible text matches for the same sound.

Following ASR processing, the ASR results (i.e., text data representing speech) may be sent by the speech recognition engine 908 to the orchestrator 814 or other processing components, which may be local to the device performing ASR and/or distributed across the network system) 108. For example, ASR results in the form of a single textual representation of the speech, an N-best list including multiple hypotheses and respective scores, lattice, etc. may be sent from the ASR component 810 to an NLU component 812 either directly or indirectly through the orchestrator component 814. Continuing with the above example, the speech recognition engine 908 may send the words "call" "John" and "Smith" to the orchestrator 814 to be conveyed to the NLU component 812.

The device performing NLU processing (e.g., the server(s) 102 and/or the speech processing system 202) may include various components, including potentially dedicated processor(s), memory, storage, etc. The device performing NLU processing may include a dedicated NLU component 812, which may include a named entity recognition (NER) component 910 and an intent classification (IC) component 912. The device performing NLU processing may additionally include NLU storage 914, and a knowledge base (not illustrated). The knowledge base is a database or other information storage that may include information about entities that may be used in resolving spoken utterances. The NLU component 812 may also utilize gazetteer information 924 stored in an entity library storage 922. The knowledge base and/or gazetteer information 924 may be used for entity resolution, for example matching ASR results with different entities (e.g., song titles, contact names, etc.). Gazetteers 924 may be linked to users (e.g., a particular gazetteer may be associated with a specific user's music collection or contact information), may be linked to certain domains (e.g., communication system, shopping), or may be organized in a variety of other ways. Domain, as used herein, may refer to a category of content, such as communications, music, videos, weather, etc.

The NLU component 812 takes text data (e.g., output from the ASR component 810) and attempts to make a semantic interpretation of the text data. That is, the NLU component 812 determines the meaning behind the text data based on the individual words and then implements that meaning. The NLU component 812 interprets a text string to derive an intent or a desired action from the user as well as the pertinent pieces of information in the text data that allow a device (e.g., the device 104, the server(s) 102, etc.) to complete that action. For example, if a spoken utterance is processed using the ASR component 810, which outputs the text data "call John Smith", the NLU component 812 may determine the user intended to activate a phone in his/her device and to initiate a call with a contact matching the entity "John Smith."

The NLU component 812 may process several textual inputs related to the same utterance. For example, if the ASR component 810 outputs N text segments (e.g., as part of an N-best list), the NLU component 812 may process all N outputs to obtain NLU results.

The NLU component 812 may be configured to parse and tag to annotate text data as part of NLU processing. For example, for the text data "call John Smith," the NLU component 812 may tag "call" as a command (e.g., to execute a phone call) and may tag "John Smith" as a specific entity and target of the command. In one embodiment, the phone number or other contact information for the entity corresponding to "John Smith" stored in a contact list (e.g., stored phonebook data within user communication profile information 1504) may be included in the annotated NLU results.

To correctly perform NLU processing of an utterance, the NLU component 812 may be configured to determine a "domain" of the utterance so as to determine and narrow down which services offered by an endpoint device (e.g., the server(s) 102, the device 104, etc.) may be relevant. For example, a device 104 may offer services relating to interactions with a phone service, a contact list service, a calendar/scheduling service, a music player service, etc. Words in text data may implicate more than one service, and some services may be functionally linked (e.g., both a phone service and a calendar service may utilize data from the contact list).

The NER component 910 receives an utterance in the form of ASR results and attempts to identify relevant grammars and lexical information that may be used to construe meaning. To do so, the NER component 910 may begin by identifying potential domains that may relate to the received utterance. The NLU storage 914 includes a database of domains 916 associated with specific devices. For example, the device 104 may be associated with domains for music, telephony, calendaring, contact lists, and device-specific communications. In addition, the entity library 922 may include database entries about specific services on a specific device, either indexed by Device ID, User ID, Household ID, or some other indicator.

A domain may represent a discrete set of activities having a common theme, such as "communicating", "shopping", "music", "calendaring", etc. As such, each domain may be associated with a particular language model and/or grammar database 918, a particular set of intents/actions 920, and/or a particular personalized lexicon 926. Each gazetteer 924 may include domain-indexed lexical information associated with a particular user and/or device. For example, the Gazetteer A 924*a* includes domain-index lexical information 926*aa* to 926*an*. A user's music-domain lexical information might include album titles, artist names, and song names, for example, whereas a user's contact-list lexical information might include the names of contacts and contact information. Since every user's music collection and contact list is presumably different, this personalized information improves entity resolution.

An utterance may be processed applying the rules, models, and information applicable to each identified domain. For example, if an utterance potentially implicates both communications and music, the utterance may be NLU processed using the grammar models and lexical information for communications, and may also be processed using the grammar models and lexical information for music. The responses to the spoken utterance produced by each set of models is scored, with the overall highest ranked result from all applied domains being ordinarily selected to be the correct result.

The IC component 912 parses the utterance to determine an intent(s) for each identified domain, where the intent(s) corresponds to the action to be performed that is responsive to the spoken utterance. Each domain is associated with a database 920 of words linked to intents. For example, a communication intent database may link words and phrases such as "call", "phone", or "dial" to a "call" intent. Similarly, a music intent database may link words and phrases such as "quiet," "volume off," and "mute" to a "mute" intent. The IC component 912 identifies potential intents for each identified domain by comparing words in the utterance to the words and phrases in the intents database 920.

In order to generate a particular interpreted response, the NER component 910 applies the grammar models and lexical information associated with the respective domain. Each grammar model 918 includes the names of entities (i.e., nouns) commonly found in speech about the particular domain (i.e., generic terms), whereas the lexical information 926 from the gazetteer 924 is personalized to the user and/or the device. For instance, a grammar model 918 associated with a shopping domain may include a database of words commonly used when people discuss shopping.

The intents identified by the IC component 912 are linked to domain-specific grammar frameworks (included in 918) with "slots" or "fields" to be filled. For example, if "call contact" is an identified intent, a grammar framework(s) may correspond to sentence structures such as "Call {Contact Number}". Similarly, for example, if "play music" is an identified intent, a grammar framework(s) may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER component 910 may parse the spoken utterance to identify words as subject, object, verb, preposition, etc., based on grammar rules and models, prior to recognizing named entities. The identified verb may be used by the IC component 912 to identify intent, which is then used by the NER component 910 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER component 910 then searches the corresponding fields in the domain-specific and personalized lexicon(s), attempting to match words and phrases in the utterance tagged as a grammatical object or object modifier with those identified in the database(s).

This process includes semantic tagging, which is the labeling of a word or combination of words according to their type/semantic meaning. Parsing may be performed using heuristic grammar rules, or the NER component 910 may be constructed using techniques such as HMMs, maximum entropy models, log linear models, conditional random fields (CRF), and the like.

For instance, continuing with the above example, the utterance "call John Smith" might be parsed and tagged as {Verb}: "Call," {Object}: "John Smith." At this point in the process, "Call" is identified as a verb based on a word database associated with the communication domain, which the IC component 912 will determine corresponds to the "call" intent. No determination has been made as to the meaning of "John Smith," but based on grammar rules and models, it is determined that these phrases relate to the grammatical object of the spoken utterance.

Similarly, for instance, an utterance of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC component 912 will determine corresponds to the "play music" intent. No determination has been made as to the meaning of "mother's little helper" and "the rolling stones," but based on grammar rules and models, it is determined that these phrases relate to the grammatical object of the spoken utterance.

The frameworks linked to the intent are then used to determine what database fields should be searched to determine the meaning of these phrases, such as searching a user's gazetteer for similarity with the framework slots. So a framework for a "play music" intent might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER component 910 may search the database of generic words associated with the domain (i.e., in the NLU storage 914). For instance, if the utterance was "play songs by the rolling stones," after failing to determine an album name or song name called "songs" by "the rolling stones," the NER component 910 may search the domain vocabulary for the word "songs." In the alternative, generic words may be checked before the gazetteer information, or both may be tried, potentially producing two different results.

The comparison process used by the NER component 910 may classify (i.e., score) how closely a database entry compares to a tagged word or phrase, how closely the grammatical structure of the utterance corresponds to the applied grammatical framework, and based on whether the database indicates a relationship between an entry and information identified to fill other slots of the framework.

The NER component 910 may also use contextual operational rules to fill slots. For example, if a user had previously requested to pause a particular song and thereafter requested that the device 104 "please un-pause my music," the NER component 910 may apply an inference-based rule to fill a slot associated with the name of the song that the user currently wishes to play-namely the song that was playing at the time the user requested to pause the music.

The results of NLU processing may be tagged to attribute meaning to the utterance. For example, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type}SONG.

Returning to FIG. 8, the output from the ASR component 810 may also be sent to a user recognition component 816 either directly or indirectly through the orchestrator component 814. Alternatively, the user recognition component 816 may be implemented as part of the ASR component 810. The user recognition component 816 performs user recognition using the audio data 806, and optionally the ASR component output. The user recognition component 816 may include a scoring component that determines respective scores indicating whether the input utterance in the audio data 806 was spoken by particular users, e.g., user 120. The user recognition component 816 may also include a confidence component that determines an overall confidence as the accuracy of user recognition operations. User recognition may involve comparing speech characteristics in the audio data 806 to stored speech characteristics of users. User recognition may also involve comparing biometric data (e.g., fingerprint data, iris data, etc.) received by the user recognition component 816 to stored biometric data of users. User recognition may further involve comparing image data including a representation of a feature of a user with stored image data including representations of features of users. It should be appreciated that other kinds of user recognition processes, including those known in the art, may be used.

Output from the NLU processing, which may include tagged text data, commands, etc., and output of the user recognition component 816 (e.g., a unique ID of a user) may be sent to a command processor 818, which may be located on a same or separate server 102 as part of the system 100. The system 100 may include more than one command processor 818, and the command processor(s) 818 may be determined based on the NLU output. For example, if the NLU output includes a command to place a call, the command processor 818 selected may correspond to the communication system 204. In another example, if the NLU output includes a command to play music, the command processor 818 selected may correspond to a music playing application, such as one located on the device 104 or in a music playing appliance. Many such command processors 818 may be available to the system 100 depending on the various applications that may be invoked. If the NLU output includes a search utterance (e.g., requesting the return of search results), the command processor 818 selected may include a search engine processor, such as one located on a search server, configured to execute a search command and determine search results, which may include output text data to be processed by a TTS engine 820 and output from a device as synthesized speech.

Output from the NLU component 812 (and optionally the user recognition component 816) may be sent to a command processor(s) 818/skill either directly or indirectly via the orchestrator component 814. A "skill" may correspond to a domain and may be software running on a server or device akin to an application. That is, a skill may enable a server(s) 102 to execute specific functionality in order to provide data or produce some other output called for by a user. The system may be configured with more than one skill. For example a weather service skill may enable the server(s) 102 to execute a command with respect to a weather service server, a car service skill may enable the server(s) 102 to execute a command with respect to a taxi service server, an order pizza skill may enable the server(s) 102 to execute a command with respect to a restaurant server, a communication skill may enable the server(s) 102 to execute a command with respect to a communication system, etc. For example, if the speech processing system 202 determines the audio data including the utterance "call John Smith" corresponded to the communication system, a command processor 818 for the communication system would be selected.

The server(s) 102 may include a communication system command processor(s) 818. The communication system command processor(s) 818 may be configured to perform various steps described herein with respect to message generation and transmission, as well as onboarding a user 120 and/or a mobile device 110.

Various machine learning techniques may be used to train and operate models to perform various steps described above, such as user recognition feature extraction, encoding, user recognition scoring, user recognition confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

FIG. 10 is a diagram of components of a communication system 204 according to embodiments of the present disclosure. Much of the functionality of the components of the communication system 204 are discussed in detail above, and reference is made to those discussions. As discussed above, in various embodiments, the device 104 may send audio data to the speech processing system 202. The speech processing system 202 may determine intent information and/or entity information using the audio data. For example, the audio data may be a digitized recording of an audible utterance including the instruction "call John Smith" as uttered by a user 120 and sensed by the device 104. The speech processing system 202 may determine that an intent of an instruction in the audio data was to place a call or send a message to a particular contact, John Smith in this example. The speech processing system 202 may utilize the speech processor 800 (including the ASR 810 and the NLU 812) as discussed above with regard to FIGS. 8 and 9 in making this determination. The speech processing system 202 may then send the intent data 1012 and entity data (e.g., contact name) to the communication system 204, for example, via the orchestrator 814. More specifically, the speech processing system 202 may send the intent data 1012 and entity data to the communication system controller 1000 of the communication system 204.

The communication system controller 1000 of the communication system 204 may receive the intent and entity information from the speech processing system 202 and may determine that the intent is to place a call to a contact "John Smith." The communication system controller 1000 includes control logic to control certain operations of the communication system 204. For example, the communication system controller 1000 makes determinations on who to call or message, and determines the call or message flow through the communication system 204. The communication system controller 1000 may be coupled to or have access to the communication profile database 1502 or cause the communication profile manager 1004 to search through a communication profile 1504 associated with the device 104, for example, to search for and retrieve contact information for contact name "John Smith." The contact information may include a number/device/communication profile to which to call or message, encodings and/or additional information regarding the intended contact. The communication system controller 1000 may then initiate the process and/or control the communication system 204 to place the call or send a message to the intended recipient (e.g., "John Smith"). In various embodiments, the communication system controller 1000 may perform steps 216, 218 in FIG. 2 and step 610 in FIG. 6.

The communication system 204 also may include a device interface 1002 configured to send and receive data to and from the device 104 either directly via the network systems 108 or through the speech processing system 202. The device interface 1002 sends all the commands to the device 104 and receives all of the data and responses back from the device 104. The device interface 1002 also communicates with the communication system controller 1000 and the communication profile manager 1004. The device interface 1002 may include one or more I/O device interfaces 1610, as is illustrated in FIG. 15. In various embodiments, the device interface 1002 may perform or otherwise be involved with steps 220 and 228 of FIG. 2; step 232 of FIG. 3; steps 250 and 256 of FIG. 4; steps 504 and 510 of FIG. 5; and steps 616 and 622 of FIG. 6.

The communication system 204 also includes a communication profile manager 1004. The communication profile manager 1004 performs all operations related to creating, deleting, editing, modifying, searching, and generally managing a plurality of communication profiles stored within the communication profile database 1502. The communication profile manager 1004 interfaces with the communication profile database 1502, which may be located remote from one or more servers 102 implementing the communication profile manager 1004. In various approaches, the communication profile manager 1004 interfaces with the communication profile database 1502 over a network system 108 via a network interface (such as I/O device interface 1610). The communication profile manager 1004 also communicates with the communication system controller 1000, the device interface 1002, and the phone number manager 1008 within the communication system 204. In various embodiments, the communication profile manager 1004 may perform or otherwise be involved with step 218 of FIG. 2; step 246 of FIG. 3; step 250 and 258 of FIG. 4; steps 502, 504, and 512 of FIG. 5; steps 612, 614, 616, and 624 of FIG. 6.

The communication system 204 may also include a phone number manager 1008. The phone number manager is responsible for all operations with regard to managing the set of verification phone numbers stored within phone number database 1010, including all managing all reservations of phone numbers and timing of same. The phone number manager 1008 also manages all operations with regard to verifying that an inbound phone call was received on the proper validation phone number within the predetermined reservation period of time. In accordance with various embodiments, the phone number manager 1008 may perform or otherwise be involved with steps 230, 232, 244, and 248 of FIG. 3 and all steps shown in FIG. 7.

Lastly, the communication system 204 also includes an inbound call receiver 1006 that is in communication with the phone number manager 1008 and the communication system controller 1000. The inbound call receiver 1006 includes IO device interfaces 1610 configured to communicate with one or more network connections to be able to receive one or multiple inbound phone calls simultaneously. The inbound call receiver 1006 also includes circuitry configured to receive and decode CID and/or ANI data received via network systems 108 and/or phone network systems 118. In accordance with various embodiments, the inbound call receiver 1006 may perform or otherwise be involved with steps 236, 238, 240, and 244 of FIG. 2; of FIG. 3 and steps 707 and 708 of FIG. 7.

Figure 11:
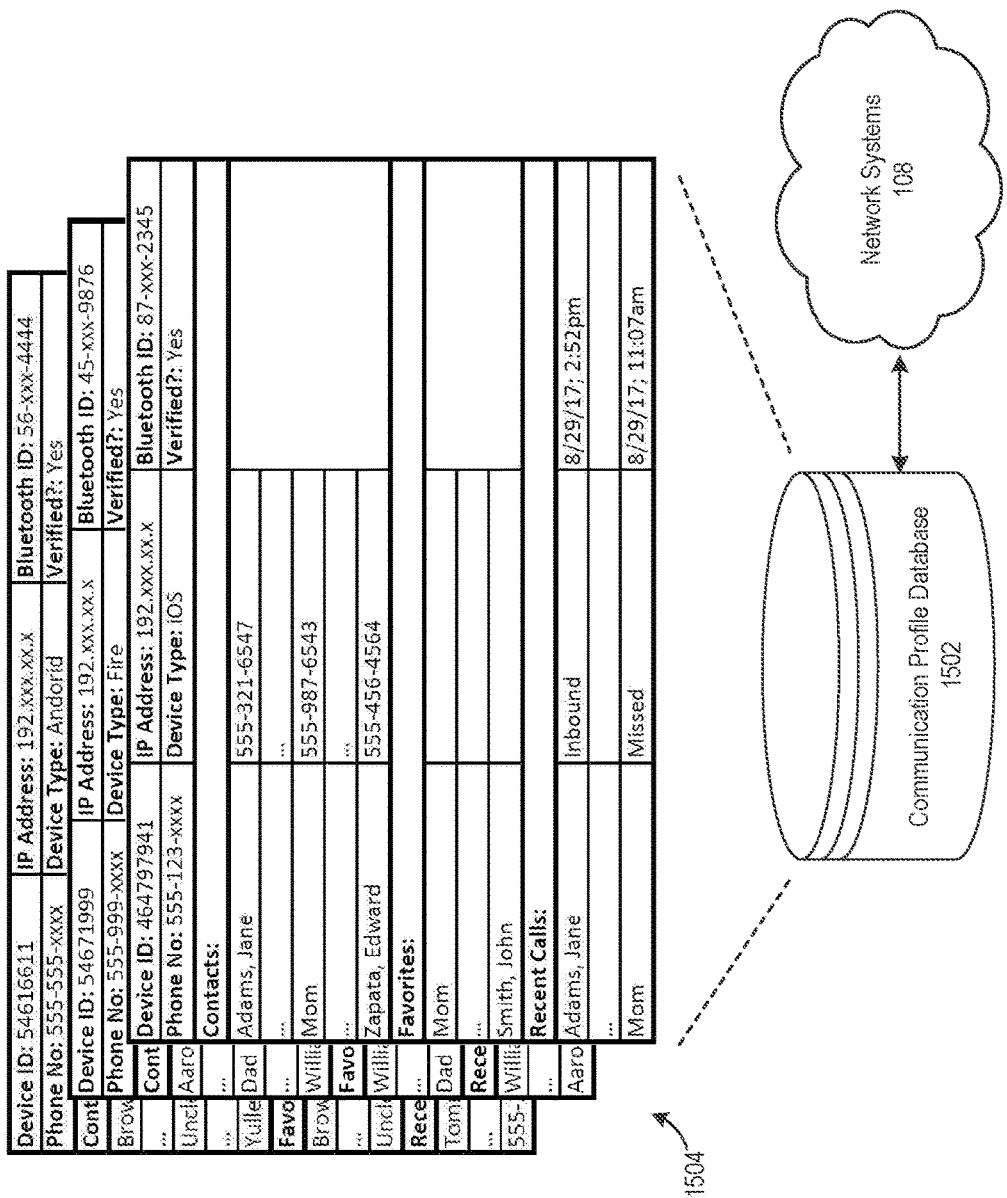
FIG. 11 illustrates data stored within a database and associated with communication profiles according to embodiments of the present disclosure.

FIG. 11 illustrates a communication profile database 1502 that includes data regarding communication profiles 1504. The communication profile database 1502 may be located proximate to the server(s) 102, or may otherwise be in communication with various components, for example over the network systems 108. In an example, the communication profile database 1502 is a cloud-based storage. The communication profile database 1502 may include a variety of information related to individual users, accounts, etc., that interact with the system 100. For illustration, as shown in FIG. 15, the communication profile database 1502 may include data regarding the devices associated with particular individual communication profiles 1504 such as, for example, a device identification, an IP address, a Bluetooth identification, a phone number, a device type, a verified flag, etc. Each communication profile 1504 may also include data such as phonebook data, including names of contacts, names of favorites, call history, and a last update date/time. In some approaches, communication profile database 1502 also stores household information regarding households (e.g., household 124). The household information may include organized collections of associated communication profiles (e.g., communication profiles of user 120 and 122 within a household 124), devices (e.g., device 104 and other devices 106 within a household 124), mobile device 110, and other user devices 114 within the household 124.

FIG. 12 illustrates a phone number database 1010 including an example phone number list 1202. The phone number database 1010 may be located proximate to the server(s) 102, or may otherwise be in communication with various components, for example over the network. The example phone number list 1202 shows various examples of metadata associated with a plurality of verification phone numbers. For example, the metadata may include the phone number, a reserved status indicator, a reservation time remaining indicator, a communication profile ID (e.g., associating a communication profile with a currently pending reservation period for a verification phone number), a priority indicator number indicating a reservation order for the verification numbers, a last used time indicating the last time the verification number was reserved, a last received phone number indicator indicating the phone number last received to the verification number, and a last received name indicator including the last set of CID name data received by the verification number. Many variations are possible.

Figure 13:
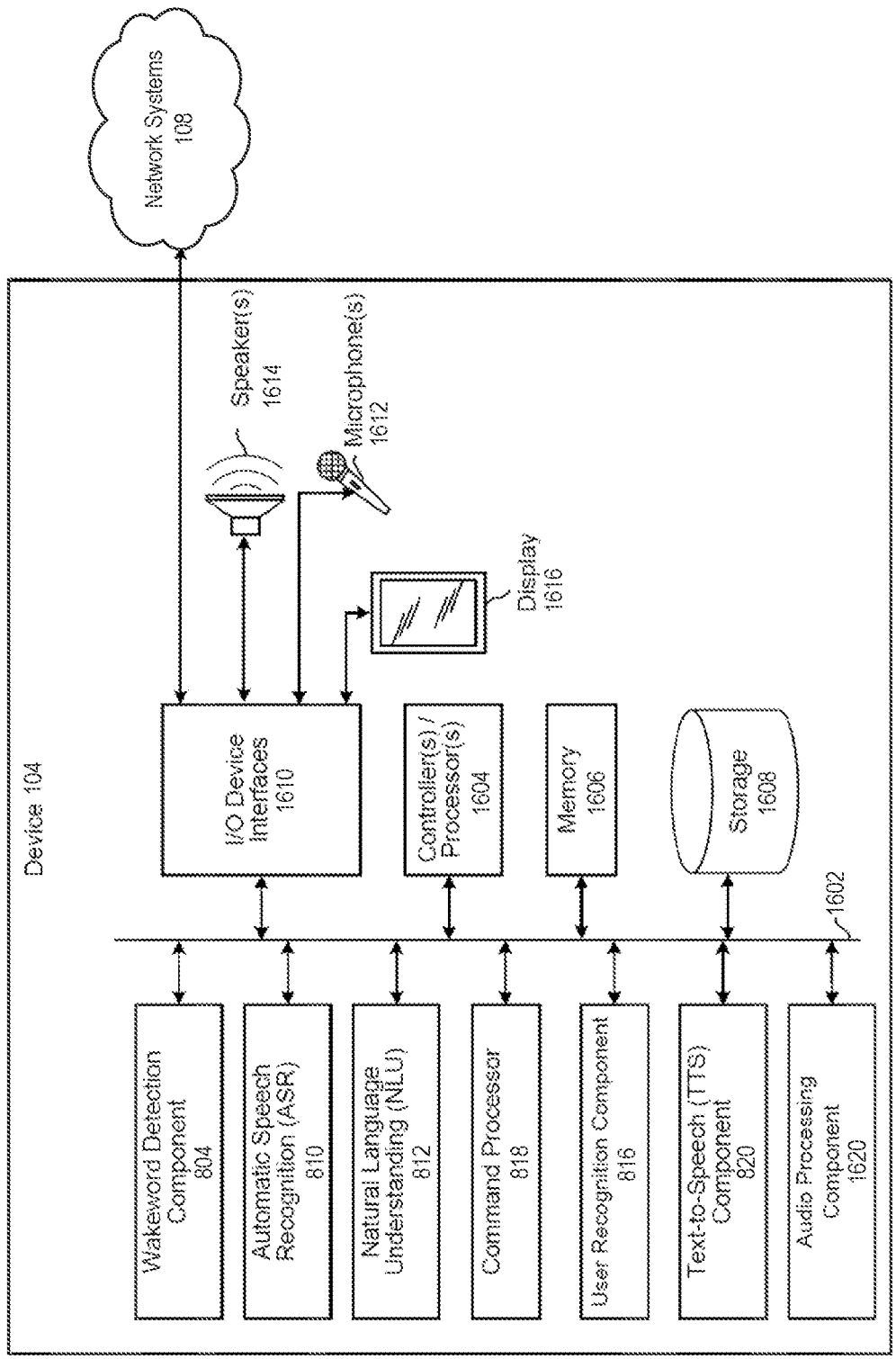
FIG. 13 is a block diagram conceptually illustrating example components of a device according to examples of the present disclosure.
Figure 14:
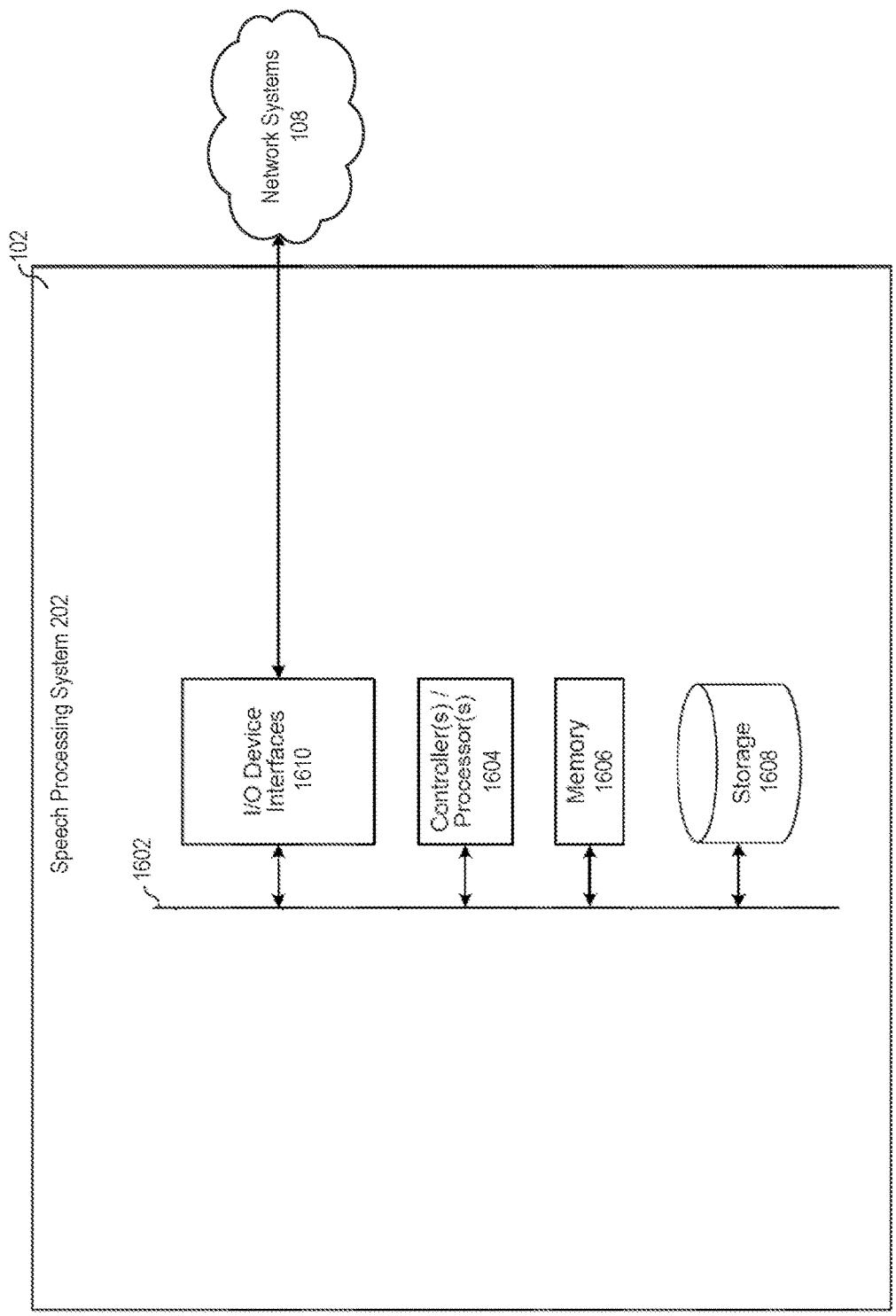
FIG. 14 is another block diagram conceptually illustrating example components of a speech processing system according to examples of the present disclosure.

FIGS. 13-15 are block diagrams conceptually illustrating example components of a system 100 for collecting and verifying phone numbers according to embodiments of the present disclosure. FIG. 13 is a block diagram conceptually illustrating a device 104 that may be used with the described system 100. FIG. 14 is a block diagram conceptually illustrating example components of a remote device, such as server(s) 102, and more specifically, a speech processing system 202, that may assist with Automatic Speech Recognition (ASR), Natural Language Understanding (NLU) processing, command processing, generating and storing progress data and/or generating synthesized speech. Multiple such server(s) 102 implementing speech processing systems 202 may be included in the system 101, such as one for ASR, one for NLU, etc. FIG. 15 is a block diagram conceptually illustrating example components of a remote device, such as server(s) 102, and more specifically, the communication systems 204. Multiple such server(s) 102 implementing communication systems 204 may be included in the system 100.

In operation, the system 100 may include computer-readable and computer-executable instructions that reside on the device 104 and server(s) 102, such as the speech processing system 202 and the communication system 204, as will be discussed further below. The device 104 may be an electronic device capable of receiving incoming audio data, generating outgoing audio data, determining voice instructions and/or generating synthesized speech. Examples of electronic devices may include audio devices (e.g., speech-controlled devices, telecommunications devices, etc.), computers (e.g., a desktop, a laptop, a server or the like), portable devices (e.g., a smart phone, tablet or the like), media devices (e.g., televisions, video game consoles, media components or the like) or the like. The device 104 or server(s) 102 may also be a component of any of the abovementioned devices or systems.

The device 104 or server(s) 102 may include an address/data bus 1602 for conveying data among components of the device 104 or server(s) 102. Each component within the device 104 or server(s) 102 may also be directly connected to other components in addition to (or instead of) being connected to other components across the bus 1602.

The device 104 or server(s) 102 may include one or more controllers/processors 1604, that may each include a central processing unit (CPU) for processing data and computer-readable instructions, and a memory 1606 for storing data and instructions. The memory 1606 may include volatile random access memory (RAM), non-volatile read only memory (ROM), non-volatile magnetoresistive (MRAM) and/or other types of memory. The device 104 or server(s) 102 may also include a data storage component 1608, for storing data and controller/processor-executable instructions (e.g., instructions to perform the algorithms illustrated in FIGS. 2-7 and discussed with respect to FIGS. 1-12). The data storage component 1608 may include one or more non-volatile storage types such as magnetic storage, optical storage, solid-state storage, etc. The device 104 or server(s) 102 may also be connected to removable or external non-volatile memory and/or storage (such as a removable memory card, memory key drive, networked storage, etc.) through the input/output device interfaces 1610.

The device 104 or server(s) 102 includes input/output device interfaces 1610. A variety of components may be connected through the input/output device interfaces 1610. For example, the device 104 may be connected to a microphone(s) 1612, speakers 1614, and/or a display 1616. However, the disclosure is not limited thereto and the device 104 may not include integrated microphone(s) 1612, speakers 1614, and/or display 1616. Thus, the microphone(s) 1612, speakers 1614, display 1616, and/or other components may be integrated into the device 104 or may be separate from the device 104 without departing from the disclosure. In some examples, the device 104 may include an inertial measurement unit (IMU), gyroscope, accelerometers or other component configured to provide motion data or the like associated with the device 104. If an array of microphones 1612 is included, approximate distance to a sound's point of origin may be performed acoustic localization based on time and amplitude differences between sounds captured by different microphones of the array. The device 104 (using microphone 1612, wakeword detection component 804, ASR component 810, etc.) may be configured to determine audio data corresponding to detected audio. The device 104 (using input/output device interfaces 1610, etc.) may also be configured to transmit the audio data to server(s) 102 for further processing or to process the data using internal components such as a wakeword detection component 804.

The input/output device interfaces 1610 may be configured to operate with network systems 108, for example a wireless local area network (WLAN) (such as WiFi), Bluetooth, ZigBee and/or wireless networks, such as a Long Term Evolution (LTE) network, WiMAX network, 3G network, etc. The network systems 108 may include a local or private network or may include a wide network such as the Internet. Devices may be connected to the network systems 108 through either wired or wireless connections.

The input/output device interfaces 1610 may also include an interface for an external peripheral device connection such as universal serial bus (USB), FireWire, Thunderbolt, Ethernet port or other connection protocol that may connect to network systems 108. The input/output device interfaces 1610 may also include a connection to an antenna (not shown) to connect one or more network systems 108 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. With specific regard to the device 104, the input/output device interfaces 1610 may comprise a wireless network interface (e.g., Bluetooth) and a second network interface (e.g., WLAN or a wired network connection). Although the present disclosure often references the Bluetooth network connection type, other suitable wireless local networks may be suitable in various embodiments, including other short-distance or "short-link" wireless connections as are known in the art.

The device 104 and/or the server(s) 102 (specifically the speech processing system 202 in FIG. 17), may include a wakeword detection component 804, an automatic speech recognition (ASR) component 810, a natural language understanding (NLU) components 812, a command processor 818 and/or a text-to-speech (TTS) component 820 as described above with regard to FIGS. 8 and 9.

The ASR component 810 in device 104 may be of limited or extended capabilities. The ASR component 810 may include the language models 902 stored in ASR model storage component 904, and an ASR component 810 that performs the automatic speech recognition process. If limited speech recognition is included, the ASR component 810 may be configured to identify a limited number of words, such as keywords detected by the device, whereas extended speech recognition may be configured to recognize a much larger range of words.

The device 104 and/or the server(s) 102 (specifically the speech processing system 202 in FIG. 17) may include a limited or extended NLU component 260. The NLU component in device 104 may be of limited or extended capabilities. The NLU component 260 may comprise the name entity recognition component 262, the intent classification component 264 and/or other components. The NLU component 260 may also include a stored knowledge base and/or entity library, or those storages may be separately located.

The device 104 and/or the server(s) 102 (specifically the speech processing system 202 in FIG. 17) may also include a command processor 818 that is configured to execute commands/functions associated with a spoken instruction as described above.

The device 104 may include a wakeword detection component 804, which may be a separate component or may be included in an ASR component 810. The wakeword detection component 804 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 104 may be configured collectively to identify a set of the directional audio signals in which the wake expression is detected or in which the wake expression is likely to have occurred.

The wakeword detection component 804 receives captured audio and processes the audio (for example, using model(s)) to determine whether the audio corresponds to particular keywords recognizable by the device 104 and/or system 100. The storage 1608 may store data relating to keywords and functions to enable the wakeword detection component 804 to perform the algorithms and methods described above. The locally stored speech models may be preconfigured based on known information, prior to the device 104 being configured to access the network by the user. For example, the models may be language and/or accent specific to a region where the user device is shipped or predicted to be located, or to the user himself/herself, based on a communication profile, etc. In an aspect, the models may be pre-trained using speech or audio data of the user from another device. For example, the user may own another user device that the user operates via spoken instructions, and this speech data may be associated with a communication profile. The speech data from the other user device may then be leveraged and used to train the locally stored speech models of the device 104 prior to the user device 104 being delivered to the user or configured to access the network by the user. The wakeword detection component 804 may access the storage 1608 and compare the captured audio to the stored models and audio sequences using audio comparison, pattern recognition, keyword spotting, audio signature, and/or other audio processing techniques.

In some examples, the device 104 may not include the ASR 810, the NLU 812, the command processor 818 and/or the TTS component 820. Instead, the server(s) 102, and specifically the speech processing system 202, may include these components and may receive audio input, perform ASR/NLU on the audio input to generate and store program data, determine a command and/or generate synthesized speech. Thus, the device 104 may receive data and/or instructions from the server(s) 102 to perform functionality associated with the ASR 810, the NLU 812, the command processor 818 and/or the TTS component 820. Additionally or alternatively, in some examples the server(s) 102 may not include the wakeword detection component 804.

The server(s) 102, and specifically the communication system 204 in FIG. 15, may further include or otherwise be coupled to the communication profile database 1502 and the phone number database 1010.

In one embodiment, the device 104 or server(s) 102 may operate using an Android operating system (such as Android 4.3 Jelly Bean, Android 4.4 KitKat or the like), an Amazon operating system (such as FireOS or the like), or any other suitable operating system. Executable computer instructions for operating the device 104 or server(s) 102 and its various components may be executed by the controller(s)/processor(s) 1104, using the memory 1106 as temporary "working" storage at runtime. The executable instructions may be stored in a non-transitory manner in non-volatile memory 1106, storage 1108, or an external device. Alternatively, some or all of the executable instructions may be embedded in hardware or firmware in addition to or instead of software. The components of the device 104 and server(s) 102, as illustrated in FIGS. 16-18, are exemplary, and may be located a stand-alone device or may be included, in whole or in part, as a component of a larger device or system.

Figure 16:
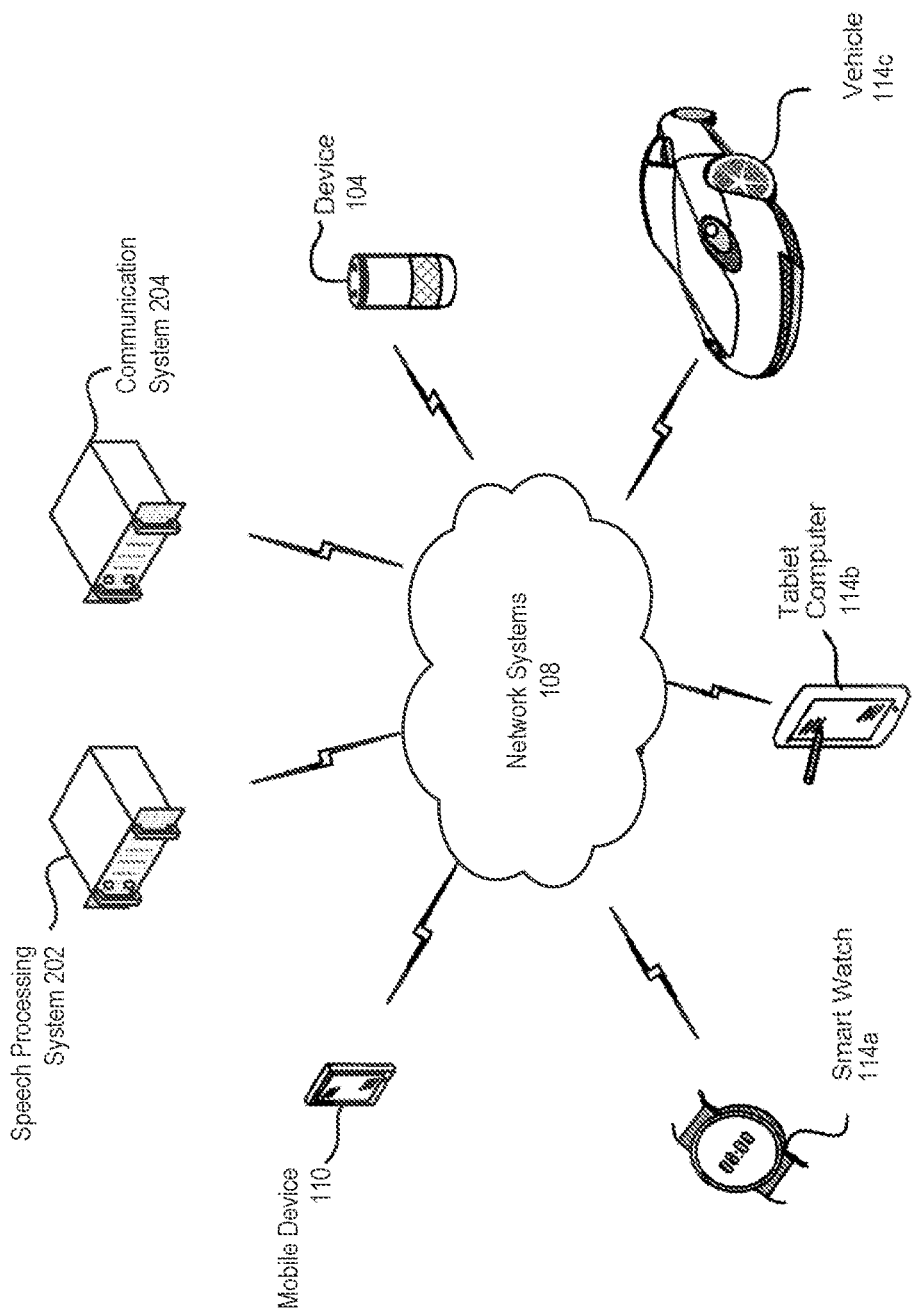
FIG. 16 illustrates an example of a network for use with the speech processing system.

As illustrated in FIG. 16, multiple devices (104, 110, 114a-c, 202, 204) may contain components of the system 100 and the devices may be connected over a network systems 108. The network systems 108 may include a local or private network or may include a wide network such as the Internet. For example, the network systems 108 may include a wired local area network (LAN), a wireless local area network (WLAN) (such as WiFi), Bluetooth, and/or wireless network, such as a Long Term Evolution (LTE) network, WiMAX network, 3G network, 4G network, etc. Devices may be connected to the network systems 108 through either wired or wireless connections. For example, device 104, a mobile device 110, a smart watch 114a, a tablet computer 114b, and/or a vehicle 114c may be connected to the network systems 108 through a wireless service provider, over a WiFi or cellular network connection, or the like. Other devices are included as network-connected support devices, such as the server(s) 102, or others. The support devices may connect to the network systems 108 through a wired connection or wireless connection. Networked devices may capture audio using one-or-more built-in or connected microphones or audio capture devices, with processing performed by ASR, NLU, or other components of the same device or another device connected via the network systems 108, such as the ASR component 810, the NLU component 812, etc. of one or more server(s) 102. Thus, while the examples illustrated above are directed to the device 104, the disclosure is not limited thereto and the device 104 may be any device capable of capturing audio from and/or outputting audio to a user. In addition, the server(s) 102 (including the speech processing system 202 and the communication system 204) may communicate with the device 104 via the network systems 108.

The concepts disclosed herein may be applied within a number of different devices and computer systems, including, for example, general-purpose computing systems, server-client computing systems, mainframe computing systems, phone computing systems, laptop computers, cellular phones, personal digital assistants (PDAs), tablet computers, video capturing devices, video game consoles, speech processing systems, distributed computing environments, etc. Thus the components, components and/or processes described above may be combined or rearranged without departing from the scope of the present disclosure. The functionality of any component described above may be allocated among multiple components, or combined with a different component. As discussed above, any or all of the components may be embodied in one or more general-purpose microprocessors, or in one or more special-purpose digital signal processors or other dedicated microprocessing hardware. One or more components may also be embodied in software implemented by a processing unit. Further, one or more of the components may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
  receiving audio data representing an utterance, the audio data generated by a first device;
  determining that the audio data represents an intent to add a phone number of a mobile device to a communication profile associated with the first device;

sending, to the first device, a first command to initiate a call from the mobile device to a first phone number, the mobile device communicatively coupled to the first device;
receiving an inbound call from the mobile device to the first phone number via a phone network system;
determining a second phone number associated with the mobile device; and
causing the second phone number to be stored in a database as associated with the communication profile.

2. The method of claim 1, further comprising:
sending, to the first device, a second command to retrieve first data from the mobile device, the first data comprising at least one of a contact list, a favorites list, or a call history stored within the mobile device;
receiving, from the first device, the first data; and
causing the first data to be stored in the database as associated with the communication profile.

3. The method of claim 2, further comprising:
determining that a present time corresponds to a scheduled time to request current data from the mobile device, the current data comprising at least one of at least a portion of a contact list that has been updated in the mobile device since a previous data retrieval, at least a portion of a favorites list that has been updated in the mobile device since the previous data retrieval, or at least a portion of a call history that has been updated in the mobile device since a previous data retrieval;
sending, to the first device, a third command to retrieve the current data from the mobile device;
receiving, from the first device, the current data; and
causing at least a portion of the current data to be stored in the database as associated with the communication profile.

4. The method of claim 1, further comprising:
selecting the first phone number from a set of phone numbers available to the communication system, each phone number of the set of phone numbers designated to contact the communication system;
setting first metadata associated with the first phone number to indicate the first phone number is reserved for receipt of an inbound call from the mobile device;
setting a predetermined reservation period of time for the first phone number; and
setting the first metadata associated with the first phone number to indicate the first phone number is available for receipt of another inbound call from another mobile device in response to at least one of:
receiving from the phone network system the second phone number associated with the inbound call to the first phone number; or
expiration of the predetermined reservation period of time.

5. The method of claim 4, wherein selecting the first phone number from the set of phone numbers further comprises:
determining that the first metadata associated with the first phone number indicates the first phone number is available for receipt of an inbound call from at least one mobile device; and
comparing second metadata associated with the first phone number to third metadata associated with at least one additional phone number of the set of phone numbers to determine that the second metadata indicates that the first phone number has an earliest last use time within the set of phone numbers, the second metadata corresponding to a last use time for the first phone number and the third metadata corresponding to a last use time for the at least one additional phone number of the set of phone numbers.

6. A computer-implemented method, comprising:
receiving input data representing a request to add a phone number to a communication profile associated with a first device;
determining a first phone number;
sending, to the first device, a first command to cause the first device to initiate a communications session via a second device using the first phone number;
determining first data comprising a second phone number associated with an inbound call from the second device to the first phone number; and
causing the second phone number to be stored in a database as associated with the communication profile.

7. The computer-implemented method of claim 6, further comprising:
selecting the first phone number from a set of phone numbers available to the communication system, each phone number of the set of phone numbers designated to contact the communication system;
setting a predetermined reservation period of time for the first phone number;
receiving the inbound call to the first phone number via a phone network system;
receiving from the phone network system the first data comprising the second phone number associated with the inbound call to the first phone number;
determining that the communication system received the inbound call to the first phone number prior to expiration of the predetermined reservation period of time for the first phone number; and
causing the second phone number to be stored in the database as associated with the communication profile responsive to determining that the communication system received the inbound call to the first phone number prior to expiration of the predetermined reservation period of time for the first phone number.

8. The computer-implemented method of claim 6, further comprising:
prior to selecting the first phone number:
receiving audio data representing audio spoken by a user, the audio data generated by the first device;
determining that the audio data corresponds to the communication system;
generating intent data representing that the audio data includes intent to utilize the communication system; and
determining that the intent data corresponds to a process involving storing in the database the second phone number of the second device as associated with the communication profile.

9. The computer-implemented method of claim 6, further comprising:
sending, to the first device, a second command to retrieve first data from the second device, the first data comprising at least one of a contact list, a favorites list, or a call history stored within the second device;
receiving, from the first device, the first data from the second device; and
causing the first data to be stored in the database as associated with the communication profile.

10. The computer-implemented method of claim 9, further comprising:

determining that a present time corresponds to a scheduled time to request current data from the second device, the current data comprising at least one of at least a portion of a contact list that has been updated in the second device since a previous data retrieval, at least a portion of a favorites list that has been updated in the second device since the previous data retrieval, or at least a portion of a call history that has been updated in the second device since a previous data retrieval;

sending, to the first device, a second command to capture the current data from the second device;

receiving, from the first device, the current data from the second device; and causing at least a portion of the current data to be stored in the database as associated with the communication profile.

11. The computer-implemented method of claim 9, further comprising:

receiving second audio data spoken by a user, the second audio data generated by the first device;

determining that the second audio data represents an intent to initiate a communications session with a first contact;

determining that the first contact is absent from the first data within the database associated with the communication profile;

sending, to the first device, a third command to search for the first contact in a phonebook within the second device;

receiving, from the first device, second data retrieved from the second device comprising the first contact; and causing the second data to be stored in the database as associated with the communication profile.

12. The method of claim 6, further comprising:

selecting the first phone number from a set of phone numbers available to the communication system, each phone number of the set of phone numbers designated to contact the communication system;

setting first metadata associated with the first phone number to indicate the first phone number is reserved for receipt of the inbound call from the second device;

setting a predetermined reservation period of time for the first phone number; and setting the first metadata associated with the first phone number to indicate the first phone number is available for receipt of another inbound call from another second device in response to at least one of:

receiving, from a phone network system, the second phone number associated with the inbound call to the first phone number; or expiration of the predetermined reservation period of time.

13. The method of claim 12, wherein selecting the first phone number from the set of phone numbers further comprises:

determining that the first metadata associated with the first phone number indicates the first phone number is available for receipt of an inbound call from at least one second device; and comparing second metadata associated with the first phone number to third metadata associated with at least one additional phone number of the set of phone numbers to determine that the second metadata indicates that the first phone number has an earliest last use time within the set of phone numbers, the second metadata corresponding to a last use time for the first phone number and the third metadata corresponding to a last use time for each phone number of the at least one additional phone number.

14. The method of claim 6, further comprising:

sending, to the second device, a message including additional information regarding the communication system, the additional information comprising at least one of a legal disclaimer or user instructions.

15. A communication system comprising:

at least one processor; and a memory including instructions operable to be executed by the at least one processor to configure the communication system to:

receive, by a communication system controller, input data representing a request to add a phone number to a communication profile associated with a first device;

determine, by a phone number manager, a first phone number;

send, by a device interface to the first device, a first command to cause the first device to initiate a communications session via a second device using the first phone number;

determine, by the phone number manager, a second phone number associated with an inbound call from the second device to the first phone number; and cause, by a communication profile manager, the second phone number to be stored in a database as associated with the communication profile corresponding to the first device.

16. The system of claim 15, wherein the phone number manager is further configured to:

select the first phone number from a set of phone numbers available to the communication system, each one of the set of phone numbers designated to contact the communication system; and set a predetermined reservation period of time for the first phone number;

wherein an inbound call receiver is further configured to:

receive the inbound call to the first phone number via a phone network system; and receive from the phone network system first data comprising the second phone number associated with the inbound call to the first phone number;

wherein the phone number manager is further configured to:

determine that the communication system received the inbound call to the first phone number prior to expiration of the predetermined reservation period of time for the first phone number; and wherein the communication profile manager is further configured to:

cause the second phone number to be stored in the database as associated with the communication profile responsive to the phone number manager determining that the communication system received the inbound call to the first phone number prior to expiration of the predetermined reservation period of time for the first phone number.

17. The system of claim 15, wherein the at least one processor is further configured to implement at least a portion of a speech processing system, the speech processing system configured to:

prior to the phone number manager selecting the first phone number:

receive, from the first device, audio data representing audio spoken by a user, the audio data generated by the first device;

determine that the audio data corresponds to the communication system; and generate intent data representing that the audio data includes intent to utilize the communication system; and wherein the communication system controller is further configured to:

receive the intent data from the speech processing system;

determine that the intent data corresponds to a process involving storing in the database the second phone number of the second device as associated with the communication profile.

18. The system of claim 15, wherein the device interface is further configured to:

send, to the first device, a second command to retrieve first data from the second device, the first data comprising at least one of a contact list, a favorites list, or a call history stored within the second device; and receive, from the first device, the first data from the second device; and wherein the communication profile manager is further configured to:

cause the first data to be stored in the database as associated with the communication profile.

19. The system of claim 18, wherein the communication profile manager is further configured to determine that a present time corresponds to a scheduled time to request current data from the second device, the current data comprising at least one of at least a portion of a contact list that has been updated in the second device since a previous data retrieval, at least a portion of a favorites list that has been updated in the second device since the previous data retrieval, or at least a portion of a call history that has been updated in the second device since a previous data retrieval;

wherein the device interface is further configured to:

send, to the first device, a second command to capture the current data from the second device; and receive, from the first device, the current data from the second device; and wherein the communication profile manager is further configured to:

cause at least a portion of the current data to be stored in the database as associated with the communication profile.

20. The system of claim 18, wherein the instructions further comprises a communication system controller configured to:

receive second audio data spoken by a user, the second audio data generated by the first device; and determine that the second audio data represents an intent to initiate a communication session with a first contact;

wherein the communication profile manager is configured to determine that the first contact is absent from the first data within the database associated with the communication profile;

wherein the device interface is further configured to:

send a third command to search for the first contact in a phonebook within the second device; and receive, from the first device, second data retrieved from the second device comprising the first contact; and wherein the communication profile manager is further configured to:

cause the second data to be stored in the database as associated with the communication profile.

21. The system of claim 15, wherein the phone number manager is further configured to:

select the first phone number from a set of phone numbers available to the communication system, each phone number of the set of phone numbers designated to contact the communication system;

set first metadata associated with the first phone number to indicate the first phone number is reserved for receipt of the inbound call from the second device;

set a predetermined reservation period of time for the first phone number; and set the first metadata associated with the first phone number to indicate the first phone number is available for receipt of another inbound call from another second device in response to at least one of:

receiving by the inbound call receiver the second phone number associated with the inbound call to the first phone number; or expiration of the predetermined reservation period of time.

22. The system of claim 21, wherein the phone number manager is further configured to:

determine that the first metadata associated with the first phone number indicates the first phone number is available for receipt of an additional inbound call from at least one second device; and compare second metadata associated with the first phone number to third metadata associated with at least one other of the set of phone numbers to determine that the second metadata indicates that the first phone number has an earliest last use time within the set of phone numbers, the second metadata corresponding to a last use time for the first phone number and the third metadata corresponding to a last use time for each phone number of the at least one other of the set of phone numbers.

* * * * *